United States Patent
Khoshnevisan et al.

(10) Patent No.: US 12,063,114 B2
(45) Date of Patent: *Aug. 13, 2024

(54) ACKNOWLEDGMENT FEEDBACK TECHNIQUES IN SHARED RADIO FREQUENCY SPECTRUM

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US); Kapil Bhattad, Bangalore (IN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 17/194,119

(22) Filed: Mar. 5, 2021

(65) Prior Publication Data

US 2021/0194633 A1 Jun. 24, 2021

Related U.S. Application Data

(63) Continuation of application No. 16/822,721, filed on Mar. 18, 2020, now Pat. No. 10,972,225.

(30) Foreign Application Priority Data

May 16, 2019 (IN) .............................. 201941019598

(51) Int. Cl.
*H04L 12/28* (2006.01)
*H04L 1/1607* (2023.01)
(Continued)

(52) U.S. Cl.
CPC .......... *H04L 1/1621* (2013.01); *H04L 1/1685* (2013.01); *H04L 1/1812* (2013.01);
(Continued)

(58) Field of Classification Search
CPC ... H04L 1/1621; H04L 5/0055; H04L 1/1812; H04L 1/1864
(Continued)

(56) References Cited

U.S. PATENT DOCUMENTS 9,877,203 B2 1/2018 Yoo et al.
10,904,876 B2 1/2021 Yerramalli et al.
(Continued)

FOREIGN PATENT DOCUMENTS

WO WO-2016179016 A2 11/2016
WO WO-2018017354 A2 1/2018
(Continued)

OTHER PUBLICATIONS

Ericsson: "HARQ and Scheduling Enhancements for NR-U," 3GPP Draft, 3GPP TSG-RAN WG1 Meeting #97, R1-1907456, HARQ and Scheduling Enhancements for NR-U, 3rd Generation Partnership Project (3GPP), Mobile Competence Centre, 650, Route Des Lucioles, F-06921, Sophia-Antipolis Cedex, France, vol. RAN WG1, No. Reno, NV, USA; May 13, 2019-May 17, 2019, May 13, 2019 (May 13, 2019), XP051728887, 15 pages, Retrieved from the Internet: URL:http://www.3gpp.org/ftp/Meetings%5F3GPP%5FSYNC/ RAN1/Docs/R1%2D1907456%2Ezip [retrieved on May 13, 2019] the whole document.
(Continued)

*Primary Examiner* — John Pezzlo
(74) *Attorney, Agent, or Firm* — Dalei Dong; Holland & Hart LLP

(57) ABSTRACT

Methods, systems, and devices for wireless communications are described that provide for group or one-shot acknowl-
(Continued)

edgment (ACK) feedback reporting, in which feedback for a number of different downlink transmissions may be provided by a user equipment (UE) to a base station. A base station may trigger a one-shot feedback report that includes less than all of the ACK feedback that is available at the UE to provide in a report. The ACK feedback may include an indication of an ACK or a negative acknowledgement (NACK) along with information related to a data indicator associated with the downlink transmission. In some cases regular ACK feedback reports and one-shot feedback reports may be multiplexed and transmitted by a UE. Further, a last downlink transmission to be included in a one-shot feedback report may be determined based on a receipt time of scheduling information or an ACK feedback timeline.

31 Claims, 23 Drawing Sheets

(51) Int. Cl.
*H04L 1/1812* (2023.01)
*H04L 5/00* (2006.01)
*H04W 16/14* (2009.01)
*H04W 28/04* (2009.01)
*H04J 1/16* (2006.01)

(52) U.S. Cl.
CPC ............ *H04L 5/001* (2013.01); *H04L 5/0055* (2013.01); *H04W 16/14* (2013.01); *H04W 28/04* (2013.01)

(58) Field of Classification Search
USPC ........................................ 370/252, 329, 430
See application file for complete search history.

(56) References Cited

U.S. PATENT DOCUMENTS

| | | | |
|---|---|---|---|
| 11,108,509 B2 | 8/2021 | Park et al. | |
| 11,245,496 B2 | 2/2022 | Peng et al. | |
| 11,336,403 B2 | 5/2022 | Tsai et al. | |
| 2020/0059327 A1* | 2/2020 | Kini | H04L 43/06 |
| 2020/0213044 A1* | 7/2020 | Peng | H04L 1/1864 |
| 2020/0220663 A1* | 7/2020 | Tsai | H04L 1/1822 |
| 2020/0221310 A1* | 7/2020 | Babaei | H04W 72/0466 |
| 2020/0312807 A1* | 10/2020 | Chen | H01L 24/73 |
| 2020/0344012 A1 | 10/2020 | Karaki et al. | |
| 2020/0366415 A1 | 11/2020 | Khoshnevisan et al. | |
| 2021/0266846 A1* | 8/2021 | Do | H04L 5/001 |
| 2021/0352704 A1* | 11/2021 | Yang | H04L 1/1671 |
| 2022/0124760 A1* | 4/2022 | Yang | H04L 5/0053 |
| 2022/0209898 A1* | 6/2022 | Karaki | H04W 72/23 |

FOREIGN PATENT DOCUMENTS

| | | |
|---|---|---|
| WO | WO-2019004883 A1 | 1/2019 |
| WO | WO-2019066630 A1 | 4/2019 |
| WO | WO-2020029189 A1 | 2/2020 |
| WO | WO-2020033237 A1 | 2/2020 |

OTHER PUBLICATIONS

International Search Report and Written Opinion—PCT/US2020/023642—ISA/EPO—dated Jul. 7, 2020.
Qualcomm Incorporated: "Enhancements to Scheduling and HARQ Operation for NR-U", 3GPP Draft, 3GPP TSG RAN WG1 Meeting #97, R1-1907263, 7.2.2.2.3 Enhancements to Scheduling and HARQ Operation for NR-U, 3rd Generation Partnership Project (3GPP), Mobile Competence Centre, 650, Route Des Lucioles, F-06921, Sophia-Antipolis Cedex, France, vol. RAN WG1, No. Reno, US, May 13, 2019-May 17, 2019, May 13, 2019 (May 13, 2019), XP051728703, 12 pages, Retrieved from the Internet: URL:http://www.3gpp.org/ftp/Meetings%5F3GPP%5FSYNC/RAN1/Docs/R1%2D1907263%2Ezip [retrieved on May 13, 2019] the whole document.
Qualcomm Incorporated: "Enhancements to Scheduling and HARQ Operation for NR-U", R1-1905001, 3GPP TSG RAN WG1 Meeting #96b, Xi'an, China, Apr. 8-12, 2019, 13 Pages.
Huawei; "Feature Lead Summary Of HARQ Enhancements for NR-U", 3GPP TSG RAN WG1 Meeting #96, R1-1903423, Athens, Greece, Feb. 25-Mar. 1, 2019, pp. 1-13.
Mediatek Inc: "Enhancements to HARQ for NR-U Operation", 3GPP Draft, R1-1906545, 3GPP TSG RAN WG1 #97, Enhancements to HARQ for NR-U Operation, MTK Final, 3rd Generation Partnership Project (3GPP), Mobile Competence Centre, 650, Route Des Lucioles, F-06921 Sophia-Antipolis Cedex, vol. RAN WG1, No. Reno, USA, May 13, 2019-May 17, 2019, May 13, 2019 (May 13, 2019), XP051727996, 11 Pages, The Whole Document.
Mediatek Inc; "Enhancements to HARQ For NR-U Operation", 3GPP TSG RAN WG1 #96bis, R1-1904484, Xi'an, China, Apr. 8-12, 2019, 12 Pages.
Panasonic; "HARQ Enhancement for NR-U", 3GPP TSG RAN WG1 #97s, R1-1906263, Reno, US, May 13-17, 2019, pp. 1-9.
European Search Report—EP23203580—Search Authority—The Hague—Jan. 31, 2024.

* cited by examiner

ACKNOWLEDGMENT FEEDBACK TECHNIQUES IN SHARED RADIO FREQUENCY SPECTRUM

CROSS REFERENCE

The present Application for Patent is a continuation of U.S. patent application Ser. No. 16/822,721 by KHOSHNEVISAN et al., entitled "ACKNOWLEDGEMENT FEEDBACK TECHNIQUES IN SHARED RADIO FREQUENCY SPECTRUM" filed Mar. 18, 2020, which claims the benefit of India Provisional Patent Application No. 201941019598 by KHOSHNEVISAN et al., entitled "DETAILS OF ONE-SHOT HARQ-ACK TRANSMISSION IN NRU," filed May 16, 2019, assigned to the assignee hereof, and expressly incorporated by reference herein.

BACKGROUND

The following relates generally to wireless communications, and more specifically to acknowledgment feedback techniques in shared radio frequency spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support acknowledgment (ACK) feedback to indicate if a wireless device (e.g., a UE) successfully decodes downlink messages (i.e., data transmissions) where the downlink message decoding is based on one or more detected downlink control messages (e.g., a downlink grant or downlink control information (DCI)). In deployments supporting shared or unlicensed radio frequency spectrums (e.g., unlicensed NR), one or more downlink messages may not be received correctly (e.g., due to a hidden interfering node) and the wireless device may not provide ACK feedback based on all of the downlink control messages. Further, in some cases a wireless device (e.g., a UE) may not be able to transmit ACK feedback when the medium is occupied by another transmitted (e.g., when a listen-before-talk (LBT) procedure fails). Techniques to enhance system performance in cases where one or more transmissions may not be sent or received are thus desirable.

SUMMARY

The described techniques relate to improved methods, systems, devices, and apparatuses that support acknowledgment feedback techniques in shared radio frequency spectrum. In various aspects, the described techniques provide for group or one-shot acknowledgment (ACK) feedback (e.g., hybrid automatic repeat request (HARQ) feedback) reporting, in which feedback for a number of different downlink transmissions may be provided by a user equipment (UE) to a base station. In some cases, a base station may trigger a one-shot feedback report that includes less than all of the ACK feedback that is available at the UE to provide in a report. For example, ACK feedback associated with a particular component carrier (CC) of a set of CCs may be requested by the base station and transmitted by the UE. In some cases, additionally or alternatively, ACK feedback may include an indication of an ACK, a negative acknowledgement (NACK) may be provided along with information related to a new data indicator (NDI) associated with the downlink transmission for which the feedback is provided. In some cases, additionally or alternatively, regular feedback reports and one-shot feedback reports may be multiplexed by a UE and transmitted to the base station. Further, in some cases, a last downlink transmission to be included in a one-shot feedback report may be determined based on a receipt time of scheduling information or an ACK feedback timeline. It is to be noted that various elements detailed as follows may be combined between independent claims described herein.

A method of wireless communications at a UE is described. The method may include determining HARQ feedback for a set of downlink transmissions from a base station, where each downlink transmission of the set of downlink transmissions has an associated data indicator that indicates whether the downlink transmission includes an initial transmission of downlink data or a retransmission of previously transmitted downlink data, receiving, from the base station, downlink control information that indicates the UE is to provide a one-shot feedback report for at least a subset of the downlink transmissions, identifying, for each downlink transmission of at least the subset of downlink transmissions, associated HARQ feedback that includes an acknowledgment/negative-acknowledgment indication and the associated data indicator, where a default data indicator is identified as the associated data indicator for one or more downlink transmissions in an absence of scheduling information for a HARQ process identification of the one or more downlink transmissions, and transmitting, to the base station, the one-shot feedback report including the HARQ feedback for at least the subset of the downlink transmissions.

An apparatus for wireless communications at a UE is described. The apparatus may include a processor, memory coupled with the processor, and instructions stored in the memory. The instructions may be executable by the processor to cause the apparatus to determine HARQ feedback for a set of downlink transmissions from a base station, where each downlink transmission of the set of downlink transmissions has an associated data indicator that indicates whether the downlink transmission includes an initial transmission of downlink data or a retransmission of previously transmitted downlink data, receive, from the base station, downlink control information that indicates the UE is to provide a one-shot feedback report for at least a subset of the downlink transmissions, identify, for each downlink transmission of at least the subset of downlink transmissions, associated HARQ feedback that includes an acknowledgment/negative-acknowledgment indication and the associated data indicator, where a default data indicator is identified as the associated data indicator for one or more downlink transmissions in an absence of scheduling information for a HARQ process identification of the one or more downlink transmissions, and transmit, to the base station, the one-shot feedback report including the HARQ feedback for at least the subset of the downlink transmissions.

Another apparatus for wireless communications at a UE is described. The apparatus may include means for determining HARQ feedback for a set of downlink transmissions from a base station, where each downlink transmission of the set of downlink transmissions has an associated data indicator that indicates whether the downlink transmission includes an initial transmission of downlink data or a retransmission of previously transmitted downlink data, receiving, from the base station, downlink control information that indicates the UE is to provide a one-shot feedback report for at least a subset of the downlink transmissions, identifying, for each downlink transmission of at least the subset of downlink transmissions, associated HARQ feedback that includes an acknowledgment/negative-acknowledgment indication and the associated data indicator, where a default data indicator is identified as the associated data indicator for one or more downlink transmissions in an absence of scheduling information for a HARQ process identification of the one or more downlink transmissions, and transmitting, to the base station, the one-shot feedback report including the HARQ feedback for at least the subset of the downlink transmissions.

A non-transitory computer-readable medium storing code for wireless communications at a UE is described. The code may include instructions executable by a processor to determine HARQ feedback for a set of downlink transmissions from a base station, where each downlink transmission of the set of downlink transmissions has an associated data indicator that indicates whether the downlink transmission includes an initial transmission of downlink data or a retransmission of previously transmitted downlink data, receive, from the base station, downlink control information that indicates the UE is to provide a one-shot feedback report for at least a subset of the downlink transmissions, identify, for each downlink transmission of at least the subset of downlink transmissions, associated HARQ feedback that includes an acknowledgment/negative-acknowledgment indication and the associated data indicator, where a default data indicator is identified as the associated data indicator for one or more downlink transmissions in an absence of scheduling information for a HARQ process identification of the one or more downlink transmissions, and transmit, to the base station, the one-shot feedback report including the HARQ feedback for at least the subset of the downlink transmissions.

In some examples of the method, apparatuses, and non-transitory computer-readable medium described herein, the transmitting may include operations, features, means, or instructions for transmitting only the one-shot feedback report with an uplink transmission to the base station. In some examples of the method, apparatuses, and non-transitory computer-readable medium described herein, the one-shot feedback report includes one or more of acknowledgment (ACK) indications, negative acknowledgment (NACK) indications, the data indicator, or combinations thereof, that may be each associated with a corresponding HARQ process identification (ID) for a downlink transmission of the set of downlink transmissions. In some examples of the method, apparatuses, and non-transitory computer-readable medium described herein, the data indicator may be a new data indicator (NDI) that is included in the one-shot feedback report based on a configuration to include NDI information with the HARQ feedback.

In some examples of the method, apparatuses, and non-transitory computer-readable medium described herein, the set of downlink transmissions includes a set of downlink transmissions that may be each associated with a different HARQ process identification.

In some examples of the method, apparatuses, and non-transitory computer-readable medium described herein, the one-shot feedback report provides HARQ feedback for each of a set of HARQ process IDs, and where the HARQ feedback is associated with one or more of a set of transport blocks, a set of component carriers, a set of code block groups, or any combinations thereof.

In some examples of the method, apparatuses, and non-transitory computer-readable medium described herein, the identifying the associated HARQ feedback may include operations, features, means, or instructions for identifying a codebook associated with the acknowledgment feedback for a set of feedback process identifications to be reported in the one-shot feedback report. In some examples of the method, apparatuses, and non-transitory computer-readable medium described herein, a latest downlink transmission of the set of downlink transmissions to be included in the one-shot feedback report may be determined based on a timing of downlink control information that schedules the set of downlink transmissions, a latest downlink transmission that meets a feedback timeline condition, or any combinations thereof.

A method of wireless communications at a base station is described. The method may include configuring a UE for reporting HARQ feedback that indicates successful or unsuccessful reception of one or more downlink transmissions at the UE, where each downlink transmission has an associated data indicator that indicates whether the downlink transmission includes an initial transmission of downlink data or a retransmission of previously transmitted downlink data, and where the HARQ feedback indicates an acknowledgment/negative-acknowledgment and the data indicator for each of the one or more downlink transmissions, transmitting a set of downlink transmissions to the UE, transmitting, to the UE, downlink control information that indicates the UE is to provide a one-shot feedback report for at least the one or more downlink transmissions, and receiving, from the UE, the one-shot feedback report that indicates HARQ feedback for each of the one or more downlink transmissions, where a default data indicator is included with the HARQ feedback for the one or more downlink transmissions in an absence of scheduling information for a HARQ process identification of one or more of the downlink transmissions.

An apparatus for wireless communications at a base station is described. The apparatus may include a processor, memory coupled with the processor, and instructions stored in the memory. The instructions may be executable by the processor to cause the apparatus to configure a UE for reporting HARQ feedback that indicates successful or unsuccessful reception of one or more downlink transmissions at the UE, where each downlink transmission has an associated data indicator that indicates whether the downlink transmission includes an initial transmission of downlink data or a retransmission of previously transmitted downlink data, and where the HARQ feedback indicates an acknowledgment/negative-acknowledgment and the data indicator for each of the one or more downlink transmissions, transmit a set of downlink transmissions to the UE, transmit, to the UE, downlink control information that indicates the UE is to provide a one-shot feedback report for at least the one or more downlink transmissions, and receive, from the UE, the one-shot feedback report that indicates HARQ feedback for each of the one or more downlink transmissions, where a default data indicator is included with the HARQ feedback for the one or more downlink transmissions in an absence of scheduling information for a HARQ process identification of one or more of the downlink transmissions.

Another apparatus for wireless communications at a base station is described. The apparatus may include means for configuring a UE for reporting HARQ feedback that indicates successful or unsuccessful reception of one or more downlink transmissions at the UE, where each downlink transmission has an associated data indicator that indicates whether the downlink transmission includes an initial transmission of downlink data or a retransmission of previously transmitted downlink data, and where the HARQ feedback indicates an acknowledgment/negative-acknowledgment and the data indicator for each of the one or more downlink transmissions, transmitting a set of downlink transmissions to the UE, transmitting, to the UE, downlink control information that indicates the UE is to provide a one-shot feedback report for at least the one or more downlink transmissions, and receiving, from the UE, the one-shot feedback report that indicates HARQ feedback for each of the one or more downlink transmissions, where a default data indicator is included with the HARQ feedback for the one or more downlink transmissions in an absence of scheduling information for a HARQ process identification of one or more of the downlink transmissions.

A non-transitory computer-readable medium storing code for wireless communications at a base station is described. The code may include instructions executable by a processor to configure a UE for reporting HARQ feedback that indicates successful or unsuccessful reception of one or more downlink transmissions at the UE, where each downlink transmission has an associated data indicator that indicates whether the downlink transmission includes an initial transmission of downlink data or a retransmission of previously transmitted downlink data, and where the HARQ feedback indicates an acknowledgment/negative-acknowledgment and the data indicator for each of the one or more downlink transmissions, transmit a set of downlink transmissions to the UE, transmit, to the UE, downlink control information that indicates the UE is to provide a one-shot feedback report for at least the one or more downlink transmissions, and receive, from the UE, the one-shot feedback report that indicates HARQ feedback for each of the one or more downlink transmissions, where a default data indicator is included with the HARQ feedback for the one or more downlink transmissions in an absence of scheduling information for a HARQ process identification of one or more of the downlink transmissions.

In some examples of the method, apparatuses, and non-transitory computer-readable medium described herein, the one-shot feedback report may be transmitted with an uplink transmission of the UE, and where only the one-shot feedback report is provided with the uplink transmission irrespective of whether a HARQ reporting timeline of one or more other types of HARQ feedback corresponds to a timing of the uplink transmission. In some examples of the method, apparatuses, and non-transitory computer-readable medium described herein, the one-shot feedback report includes one or more of acknowledgment (ACK) indications, negative acknowledgment (NACK) indications, the data indicator, or combinations thereof, that may be each associated with a corresponding HARQ process identification (ID) for a downlink transmission of the set of downlink transmissions. In some examples of the method, apparatuses, and non-transitory computer-readable medium described herein, the data indicator may be a new data indicator (NDI).

In some examples of the method, apparatuses, and non-transitory computer-readable medium described herein, the set of downlink transmissions includes a set of downlink transmissions that are each associated with a different HARQ process ID. In some examples of the method, apparatuses, and non-transitory computer-readable medium described herein, the one-shot feedback report provides HARQ feedback for each of a set of HARQ process IDs, and where the HARQ feedback is associated with one or more of a set of transport blocks, a set of component carriers, a set of code block groups, or any combinations thereof.

In some examples of the method, apparatuses, and non-transitory computer-readable medium described herein, the default data indicator may be reported by the UE for a first feedback process identification for which the UE has not received scheduling information that indicates the first feedback process identification is to be used to indicate feedback for one of the subset of the downlink transmissions. In some examples of the method, apparatuses, and non-transitory computer-readable medium described herein, the default data indicator may be applied at a polar decoder as a frozen bit to assist decoding of the feedback report when scheduling information that indicates the first feedback process identification has not been transmitted to the UE.

In some examples of the method, apparatuses, and non-transitory computer-readable medium described herein, a latest downlink transmission of the set of downlink transmissions to be included in the one-shot feedback report may be determined based on a timing of downlink control information that schedules the set of downlink transmissions, a latest downlink transmission that meets a feedback timeline condition, or any combinations thereof.

DETAILED DESCRIPTION

Figure 1:
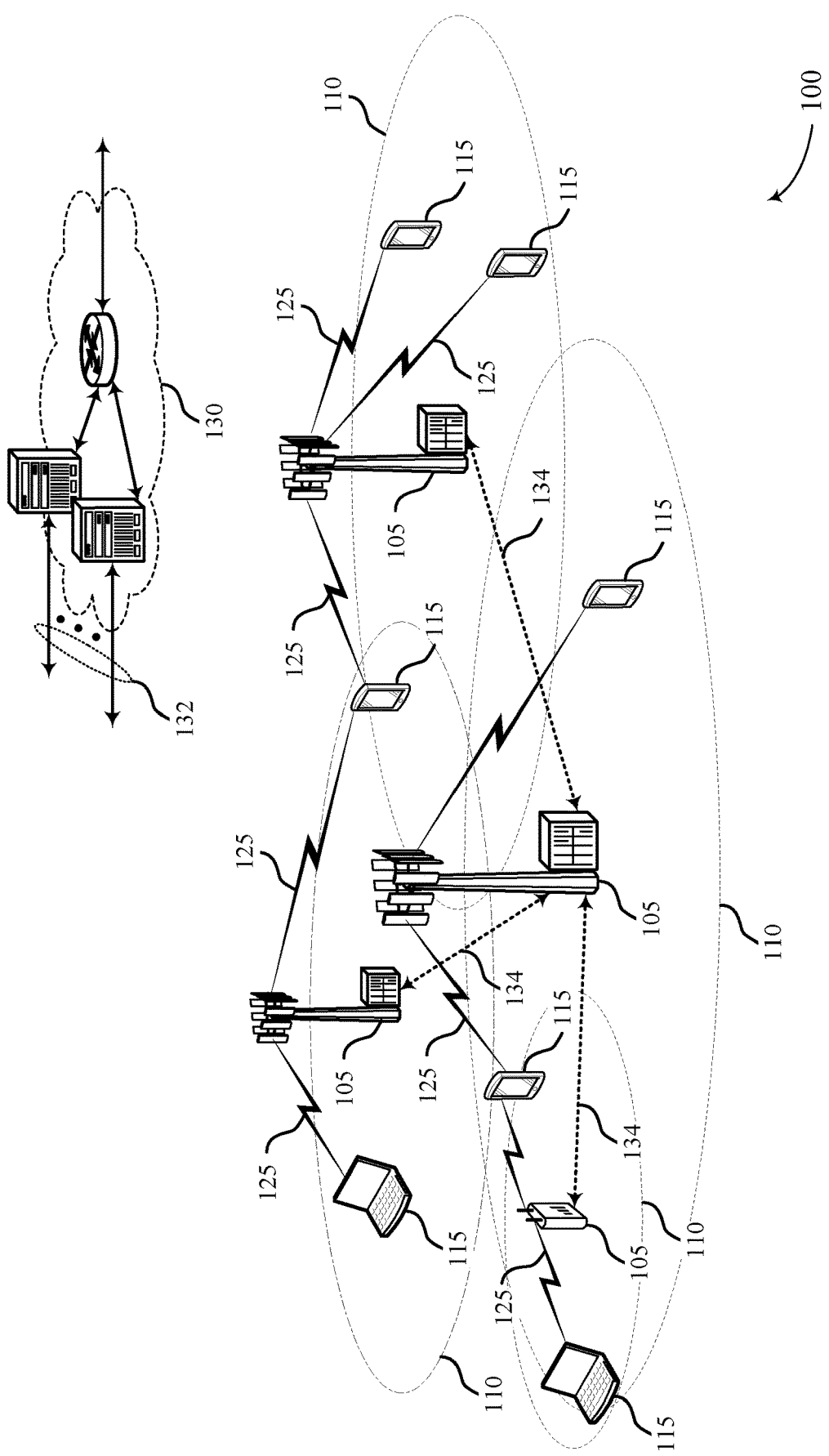
FIG. 1 illustrates an example of a system for wireless communications that supports acknowledgment feedback techniques in shared radio frequency spectrum in accordance with aspects of the present disclosure.

The described aspects of the disclosure relate to improved methods, systems, devices, or apparatuses that facilitate feedback for transmissions or retransmissions, such as hybrid automatic repeat request (HARQ) acknowledgment/negative-acknowledgment (ACK/NACK) feedback reports. In some examples, the techniques described herein enable efficient group or one-shot HARQ feedback reporting, in which feedback for a number of different downlink transmissions may be provided by a user equipment (UE) to a base station in a wireless communications system.

In some cases, a wireless communications system may further support communications in an unlicensed spectrum (e.g., a shared radio frequency spectrum band), licensed spectrum, or a combination of licensed and unlicensed spectrums. In such systems, one or more transmissions may not be successfully received due to interference from a hidden node, or may not be transmitted due to LBT failure. Accordingly, the HARQ feedback may not include feedback for one or more of the missed HARQ process IDs (e.g., due to interference, LBT failure, etc.). One-shot or group HARQ feedback reports may be used in such cases, which allow the UE to transmit feedback for all of the HARQ processes that are configured at the UE. The base station may trigger the one-shot HARQ feedback in a downlink message (e.g., downlink or uplink grant), in a separate downlink message (e.g., a separate DCI), or in a group common DCI provided to a number of UEs. If the HARQ feedback for a particular HARQ process ID is ready when the trigger is received, the UE may transmit appropriate HARQ feedback based on decoding results. Alternatively, if the HARQ feedback for a particular HARQ process ID is not ready when the trigger is received (e.g., based on an associated feedback timeline), the UE may transmit a previous value or a default value (e.g., a NACK) for the particular HARQ process.

In some cases, a base station may trigger a one-shot feedback report that includes a subset of less than all of the HARQ feedback that is available at the UE to provide in a report. For example, HARQ feedback associated with a particular component carrier (CC) of a set of CCs may be requested by the base station and transmitted by the UE. In some cases, the subset of HARQ feedback may be associated with a transport block, one or more HARQ process IDs, one or more code block groups (CBGs), a particular new data indicator (NDI) state, one or more CCs, or combinations thereof. The base station may indicate the subset of HARQ feedback in downlink control information (DCI) that is transmitted to trigger the UE to transmit the one-shot feedback. In some cases, the signaling in the DCI may be explicit (e.g., in one or more DCI information fields) or may be implicit (e.g., based on a CC that transmits the DCI or CCs that are scheduled by the DCI). Such techniques may allow for more efficient use of resources by reducing an amount of data transmitted in such one-shot HARQ feedback reports (e.g., HARQ feedback for only a CC which receives interference or failed a LBT procedure).

In some cases, HARQ feedback may include an indication of an ACK or NACK may be provided along with information related to a NDI associated with the downlink transmission for which the feedback is provided. In some cases, a tri-state indication may be used to indicate, for a particular HARQ ID, an ACK for a first NDI, an ACK for a second NDI, or a NACK. In some cases, the base station may configure one or more codebooks that provide bit sequences for different combinations of feedback indications for each HARQ ID. Such a tri-state indications may allow for reduced overhead through transmission of fewer bits. Further, by providing an indication of the NDI associated with the feedback information may reduce ambiguity that may result from a UE not receiving scheduling information that may indicate a different NDI.

In some cases, regular feedback reports and group one-shot feedback reports may be multiplexed by a UE and transmitted to the base station. In some cases, regularly scheduled feedback (e.g., based on predefined uplink control information resources associated with scheduled downlink transmissions to a UE) may be provided, that may be concatenated with a one-shot report. In some cases, one or more downlink transmissions may have HARQ feedback reported in both reports (e.g., one HARQ ID may be reported in each feedback report). Such techniques may provide certainty related to size and content of each HARQ feedback report.

Further, in some cases, a last downlink transmission to be included in a one-shot feedback report may be determined based on a receipt time of scheduling information or an HARQ feedback timeline. For example, if a first downlink transmission having an associated first HARQ ID is transmitted before a feedback timeline that is based on a processing time prior to transmission of the HARQ report, it will be included in the HARQ report, and if a second downlink transmission having an associated second HARQ ID is transmitted after the feedback timeline, it will not be included in the HARQ report. Such a timeline based determination for including feedback information in a feedback report may provide defined rules for including certain HARQ feedback in a feedback report and may reduce ambiguity in expected information in such reports. It is to be noted that various techniques detailed herein may be implemented in conjunction with other of the disclosed techniques, or independently of other of the described techniques.

Aspects of the disclosure are initially described in the context of a wireless communications system. Additional aspects of the disclosure are then described with respect to group or one-shot ACK feedback schemes. Aspects of the disclosure are further illustrated by and described with reference to apparatus diagrams, system diagrams, and flowcharts that relate to acknowledgment feedback techniques in shared radio frequency spectrum.

FIG. 1 illustrates an example of a wireless communications system 100 that supports acknowledgment feedback techniques in shared radio frequency spectrum in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed or shared radio frequency spectrum bands. For example, wireless communications system 100 may employ License Assisted Access (LAA), LTE-Unlicensed (LTE-U) radio access technology, or NR technology in an unlicensed band (NR-U) such as the 5 GHz ISM band. When operating in unlicensed or shared radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, UEs 115 and base stations 105 may support retransmissions of data to increase the likelihood that data is received successfully. HARQ feedback such as discussed herein is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval. In some cases, one-shot HARQ feedback may be enabled, in which a base station 105 may trigger a one-shot HARQ report to prompt a UE 115 to transmit HARQ feedback for each of its configured HARQ process IDs. Various techniques described herein enable efficient one-shot HARQ feedback reporting, in which feedback for a number of different downlink transmissions may be provided by a UE 115 to a base station 105.

Figure 2:
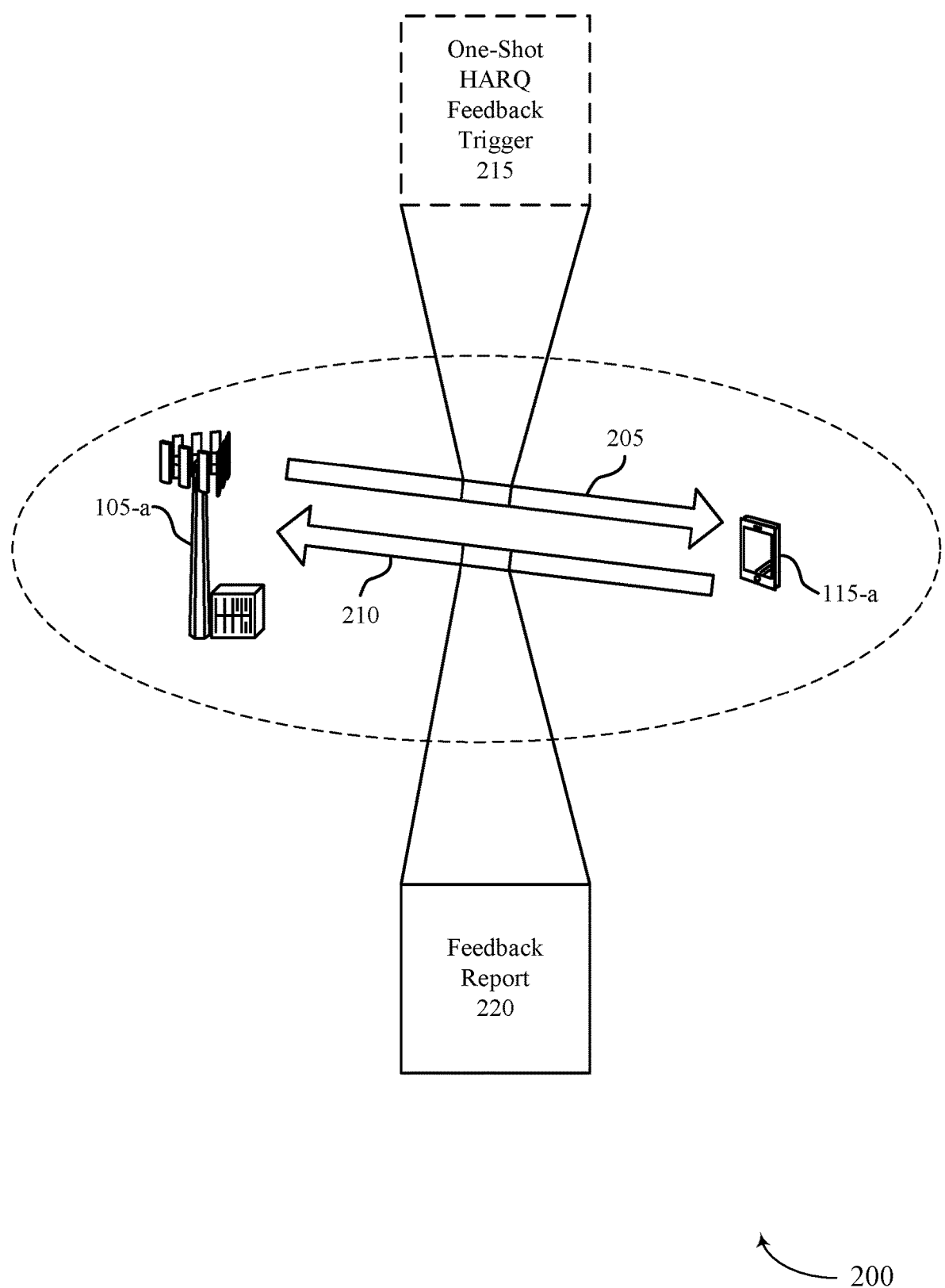
FIG. 2 illustrates an example of a portion of a wireless communications system that supports acknowledgment feedback techniques in shared radio frequency spectrum in accordance with aspects of the present disclosure.

FIG. 2 illustrates an example of a wireless communications system 200 that supports acknowledgment feedback techniques in shared radio frequency spectrum in accordance with aspects of the present disclosure. In some examples, wireless communications system 200 may implement aspects of wireless communications system 100. Wireless communications system 200 may include a base station 105-a and a UE 115-a, which may be examples of corresponding base stations 105 and UEs 115 as described with reference to FIG. 1.

As described herein, base station 105-a and UE 115-a may communicate in an unlicensed spectrum (e.g., a shared radio frequency spectrum band) and may employ HARQ feedback techniques to indicate whether data has been received correctly at UE 115-a. For example, base station 105-a may transmit one or more downlink messages to UE 115-a on resources of a carrier 205. Accordingly, UE 115-a may transmit an indication of whether the one or more downlink messages were received and decoded correctly on resources of a carrier 210. In some cases, carriers 205 and 210 may be the same carrier. In some cases, carriers 205 and 210 may be component carriers (CCs), and a number of different CCs may be used for communications between the UE 115-a and the base station 105-a. In this example, base station 105-a may transmit a one-shot HARQ feedback trigger 215 on carrier 205, and UE 115-a responds with feedback report 220 on carrier 210. One-shot HARQ feedback trigger 215 may be included in a downlink or uplink grant (e.g., downlink message such as PDCCH), or UE 115-a may be explicitly triggered to transmit feedback report 220 (e.g., in a separate DCI message).

When one-shot HARQ feedback trigger 215 is present, UE 115-a may be indicated, by base station 105-a, to provide the feedback report 220 based on one or more configured HARQ processes for UE 115-a. For example, the base station 105-a may configure the UE 115-a with eight HARQ process IDs, and each transport block (TB) transmitted by the base station 105-a may have an associated HARQ ID. The UE 115-a may use the indicated HARQ ID to provide feedback that indicates to the base station 105-a whether the associated TB is successfully or unsuccessfully received. In some cases, scheduling information for a downlink transmission may also include a NDI associated with the downlink transmission (e.g., a scheduled TB), which may indicate if the transmission is an initial transmission of data for the TB or a retransmission of data for the TB (that may then be used in soft-combining techniques).

The feedback report 220 may indicate HARQ feedback for all or a subset of the configured HARQ processes for UE 115-a. In some cases, feedback information each HARQ ID may include a corresponding code block group (CBG) or TB level ACK bits based on its configuration. In some cases, UE 115-a may be explicitly triggered by one-shot HARQ feedback trigger 215 for the feedback report 220 along with an indication of a particular transmission time interval (e.g., slot, symbol, etc.) for transmitting the feedback report 220. UE 115-a may populate the fields for feedback report 220 based on decoding results for the corresponding HARQ process (e.g., ACK if successfully decoded, NACK if unsuccessfully received/decoded). In some cases, UE 115-a may populate the corresponding fields for feedback report 220 with previous values for the HARQ process or with a default value (e.g., ACK, NACK, NDI, or any combinations thereof). Base station 105-a may accordingly interpret if the fields for each HARQ process are based on decoding results, previous values, or default values. As will be discussed in more detail with reference to FIGS. 3 through 7, in various examples the feedback report 220 may include HARQ feedback for one or more subsets of HARQ information, which may be multiplexed with one or more other reports, may indicate feedback and an associated NDI, may include HARQ feedback for HARQ IDs based on timelines associated with scheduling and transmitting reports, or any combinations thereof.

Figure 3:
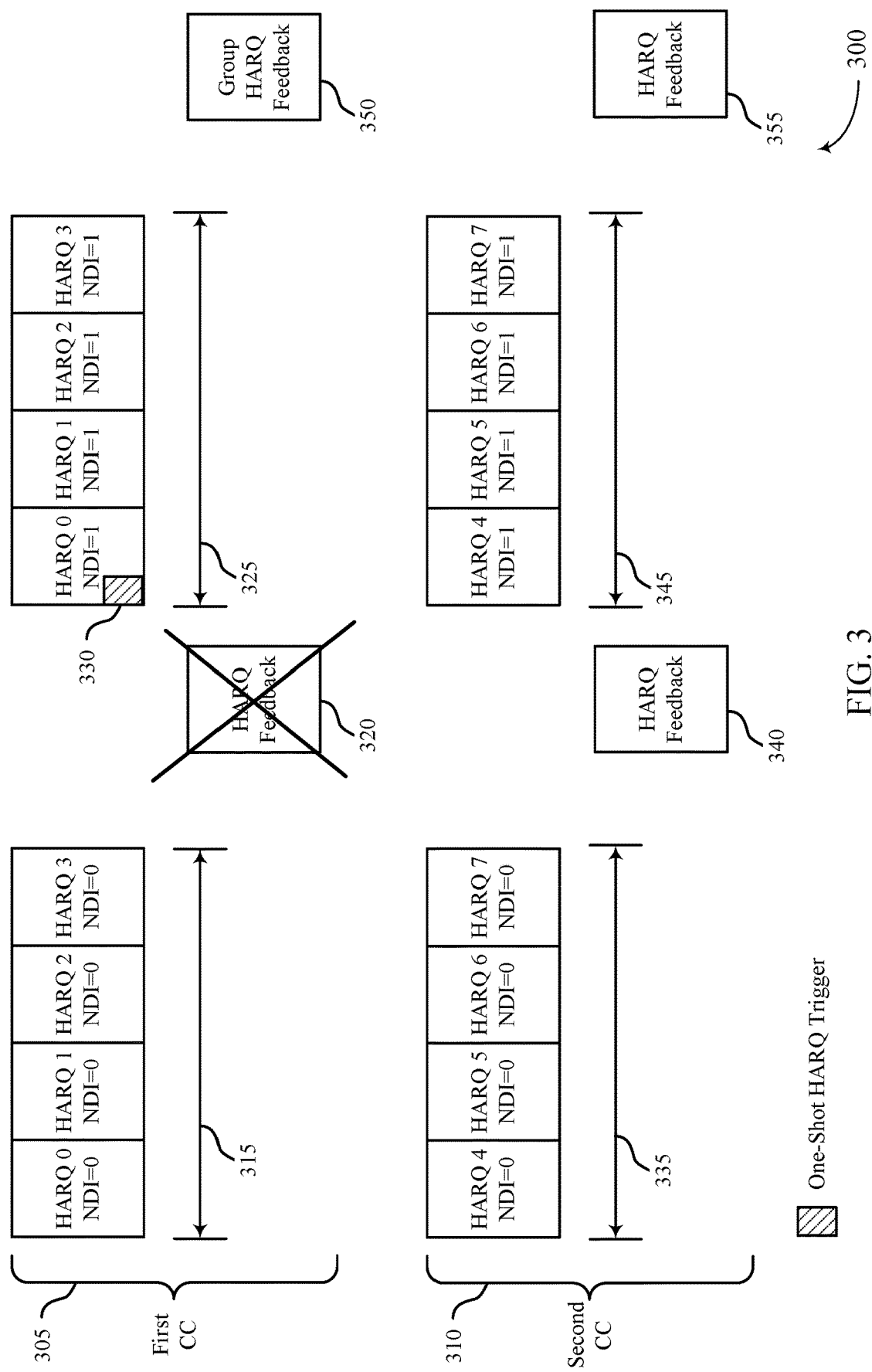
FIG. 3 illustrates an example of ACK feedback timelines that support acknowledgment feedback techniques in shared radio frequency spectrum in accordance with aspects of the present disclosure.

FIG. 3 illustrates an example of ACK feedback timelines 300 that support acknowledgment feedback techniques in shared radio frequency spectrum in accordance with aspects of the present disclosure. In some examples, ACK feedback timelines 300 may implement aspects of wireless communications system 100 or 200. In this example, a UE (e.g., a UE 115 of FIG. 1 or 2) and a base station (e.g., a base station 105 of FIG. 1 or 2) may establish multiple CCs for downlink transmissions, uplink transmissions, or both. In the example of FIG. 3, a first CC 305 and a second CC 310 may be configured.

The base station may transmit a first subset of downlink transmissions 315 via the first CC 305, which the UE may attempt to receive and decode. In this example, the UE may have eight HARQ processes configured, having HARQ IDs 0 through 7. Further, scheduling information provided for downlink transmissions may include a NDI for each transmission, which the UE may use in decoding the associated transmissions. In this example, downlink transmissions (e.g., TBs) associated with HARQ IDs 0 through 3, each having an NDI of zero, may be scheduled as the first subset of downlink transmissions 315. Further, a second subset of downlink transmissions 325 may be scheduled for HARQ IDs 0 through 3 that each have an NDI of one. Similarly, on the second CC 310, a third subset of downlink transmissions 335 may have HARQ IDs 4 through 7 each having an NDI of 0, and a fourth subset of downlink transmissions 345 may have HARQ IDs 4 through 7 each having an NDI of 1. It is noted that this example is provided for purposes of discussion and illustration, and numerous different examples of downlink transmissions may be used to implement techniques discussed herein.

In some cases, the UE may be configured to provide HARQ feedback 320 associated with the first subset of downlink transmissions 315 using uplink resources that are predetermined or provided in scheduling information associated with the first subset of downlink transmissions 315. In this example, the UE may not successfully transmit the HARQ feedback 320, due to a failed LBT or interference from another transmitter, for example. In this example, the base station may provide a one-shot HARQ trigger 330 to the UE to trigger a one-shot group HARQ feedback report 350. The UE may also be configured to provide HARQ feedback 340 and 355 for the third subset of downlink transmissions 335 and fourth subset of downlink transmissions 345, respectively. The base station may transmit one-shot HARQ trigger 330, in this example, which may trigger the UE to transmit group HARQ feedback report 350.

In some cases, the one-shot HARQ trigger 330 may indicate that the UE is to transmit HARQ feedback for each configured HARQ process ID (e.g., for HARQ IDs 0 through 7 in the example of FIG. 3). Further, since different transmissions may have different NDIs, the UE may also provide an indication of which NDI is associated each feedback indication. In cases where the group HARQ feedback report 350 includes all of such information, the size of the report can become relatively large (e.g., five CCs may be configured, each having 16 HARQ IDs, that can correspond to 2 TBs, resulting in a payload size of 5*16*2 bits for A/N bits and 5*16*2 bits for NDIs, and CBG-based feedback can further increase the payload). Further, in some cases, such as in the example of FIG. 3, only a subset of transmissions may have missing feedback, such as the feedback from HARQ feedback report 320 associated with the first subset of downlink transmissions 315. In such cases, the one-shot HARQ trigger 330 may indicate a subset of HARQ information that is to be reported in the group HARQ feedback report 350.

In some cases, one or more fields may be included in a DCI that includes the one-shot HARQ trigger 330, which may indicate the particular subset of HARQ feedback is to be reported by the UE. Further, in some cases a downlink assignment indicator (DAI) field in DCI may be reused to provide an indication of one or more subsets of HARQ feedback that are to be reported. Such a DAI field may be reused for one-shot triggering due to the DAI field being used to indicate regular feedback resources, rather than one-shot feedback information, and thus a DCI containing a one-shot HARQ trigger 330 may re-purpose this field. In some examples, the DCI may indicate request for all CCs or a subset of CCs, which may be explicitly indicated in the DCI or be implicit. In cases where the requested CCs are implicit, the subset of CCs to be reported may be based on, for example, a scheduling CC (e.g., only HARQ feedback of the CC that the DCI is detected on is requested), or a scheduled CC (e.g., only HARQ feedback of the scheduled cell is requested, in which case the DCI requesting the one-shot HARQ feedback may also schedule PDSCH in a CC that may be different than the CC carrying the DCI). Further, for a given CC or for all CCs, the DCI may indicate a request for all configured HARQ IDs or a subset of them (e.g., DCI can indicate all of configured HARQ IDs or a first half of configured HARQ IDs through a one bit indication in the DCI). In some cases, requesting only a first half of the configured HARQ IDs may be desirable because the base station may only rarely use HARQ IDs in the second half, or the base station may be aware that no HARQ IDs of the second half of HARQ IDs have been used for a particular CC. Additionally, in some cases, the DCI can indicate whether to include an indication of NDIs with the HARQ feedback, and the UE may use a codebook to determine the HARQ feedback based on whether NDIs are to be indicated or not. Additional details related to NDI indications are discussed with reference to FIG. 4. Further, in some cases the DCI may indicate whether to include CBG-based HARQ feedback or not, which may apply to all CCs or HARQ IDs, or can be controlled separately for a group of CCs or HARQ IDs. In some cases, the base station may configure the UE (e.g., during a RRC connection establishment or reestablishment) with what type of information may be requested for a one-shot HARQ feedback report.

Figure 4:
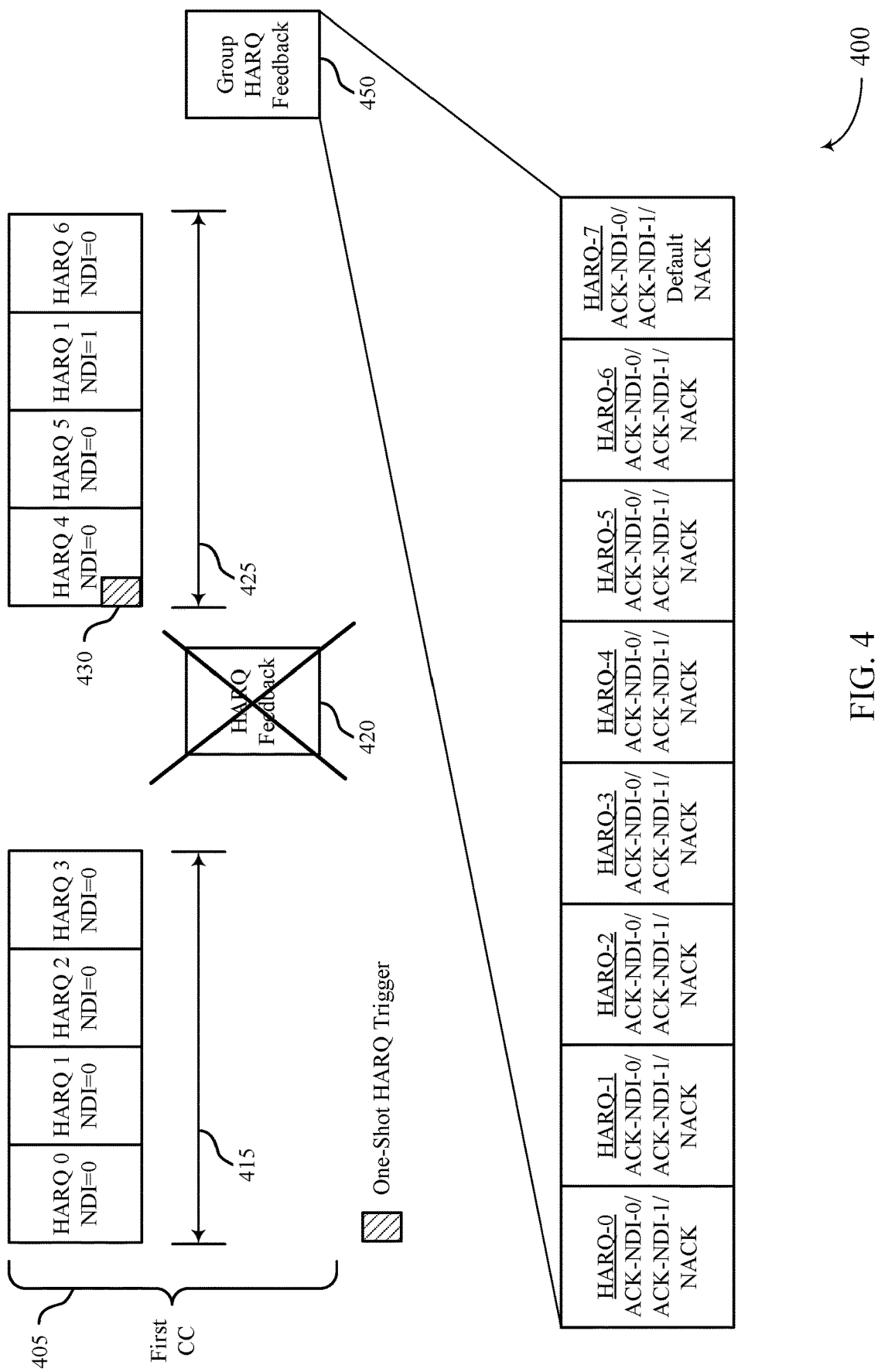
FIG. 4 illustrates an example of feedback information that supports acknowledgment feedback techniques in shared radio frequency spectrum in accordance with aspects of the present disclosure.

FIG. 4 illustrates an example of feedback information 400 that supports acknowledgment feedback techniques in shared radio frequency spectrum in accordance with aspects of the present disclosure. In some examples, feedback information 400 may implement aspects of wireless communications system 100 or 200. In this example, a UE (e.g., a UE 115 of FIG. 1 or 2) and a base station (e.g., a base station 105 of FIG. 1 or 2) may establish multiple CCs for downlink transmissions, uplink transmissions, or both. In the example of FIG. 4, a first CC 405 is illustrated, with the understanding that one or more other CCs may be present.

The base station may transmit a first subset of downlink transmissions 415 via the first CC 405, which the UE may attempt to receive and decode. In this example, the UE may have eight HARQ processes configured, having HARQ IDs 0 through 7. Further, scheduling information provided for downlink transmissions may include a NDI for each transmission, which the UE may use in decoding the associated transmissions. In this example, downlink transmissions (e.g., TBs) associated with HARQ IDs 0 through 3, each having an NDI of zero, may be scheduled as the first subset of downlink transmissions 415. Further, a second subset of downlink transmissions 425 may be scheduled for HARQ IDs 4, 5, and 6 that each have a NDI of 0 and for HARQ ID 1 with a NDI of 1. In this example, HARQ feedback 420 may not be successfully transmitted (e.g., due to LBT failure) or received (e.g., due to interference), and the base station may transmit a one-shot HARQ trigger 430 to trigger group HARQ feedback report 450. The group HARQ feedback report 450 may be triggered for a subset of downlink transmissions, as discussed herein.

In this example, the group HARQ feedback report 450 may include HARQ feedback information for each of the configured HARQ IDs, which in this example are HARQ IDs 0 through 7. Further, in this example, the group HARQ feedback report 450 may be configured to include NDI information associated with a HARQ ID in order to reduce ambiguity associated with the HARQ feedback. For example, in HARQ ID 1 in this case has NDI of 0 and NDI of 1 for different downlink transmissions. Thus, if an ACK is reported for HARQ ID 1, there may be ambiguity regarding which NDI the ACK is associated with. Further, if none of the HARQ ID 1 transmissions are successfully received, a single NACK may indicate that retransmission is needed, because the base station may assume that NACK is for the latest NDI.

In this example, NDI compression may be achieved through a three-state indicator. Thus, instead of 2-bits per HARQ ID per TB (i.e., one bit for ACK/NNACK plus one bit for NDI), a three state feedback indication may be provided that indicates NACK, ACK with NDI=0, or ACK with NDI=1. Such a tri-state indication may reduce the payload size of the feedback report. For example, if 16 HARQ IDs are configured, this results in 26 bits being needed to report the HARQ feedback (i.e., log $2(3^{16})=26$ bits) rather than 32 bits for a four bit indicator. In some cases, a codebook may be configured that provides bit sequences for different combinations of feedback for the configured number of HARQ IDs, and the UE may select the 26 bit HARQ feedback based on a mapping between the indicators for each HARQ ID and the bit sequence from the codebook.

Further, in some cases, the UE may not be scheduled for transmissions for a particular HARQ ID, and in such cases the one-shot feedback report may include a default value (e.g., NDI=0) for the NDI associated with such a HARQ ID, along with the ACK/NACK bit (e.g., indicating NACK). In such cases, the base station, if such a HARQ ID had been scheduled, may receive the NACK and determine that the scheduling information and/or transmission was not successfully received, and if such a HARQ ID has not been scheduled may know the value for that particular bit in the feedback report. In some cases, if the particular HARQ process has not been used, the base station may use this known bit value to assist in decoding (e.g., a frozen bit may be provided to a Polar decoder to help improve the performance and efficiency of decoding the feedback report). Further, in some cases, the default value for NDI may be used at the base station as well, and when the base station schedules a HARQ ID for a first time the default NDI (e.g., NDI=0) may be used. In this case, the NDI value for the HARQ process in the one-shot report is known, no matter whether the UE received the grant or not, which the base station may use to assist decoding (e.g., by providing a frozen bit to a Polar decoder).

Figure 5:
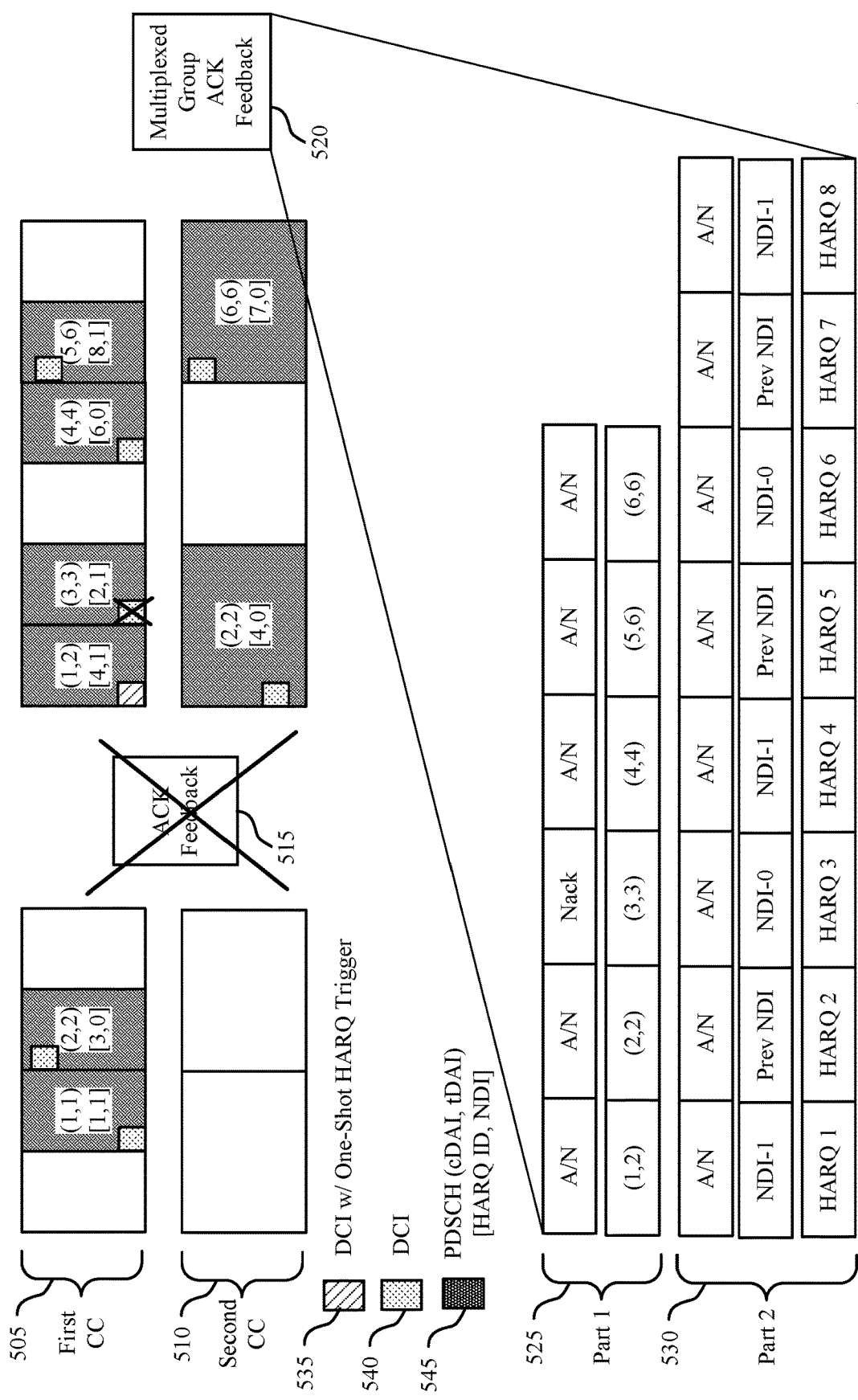
FIG. 5 illustrates an example of multiplexed feedback reports that supports acknowledgment feedback techniques in shared radio frequency spectrum in accordance with aspects of the present disclosure.

FIG. 5 illustrates an example of a multiplexed feedback reports 500 that supports acknowledgment feedback techniques in shared radio frequency spectrum in accordance with aspects of the present disclosure. In some examples, multiplexed feedback reports 500 may implement aspects of wireless communications system 100 or 200. In this example, a UE (e.g., a UE 115 of FIG. 1 or 2) and a base station (e.g., a base station 105 of FIG. 1 or 2) may establish multiple CCs for downlink transmissions, uplink transmissions, or both. In the example of FIG. 5, a first CC 505 and a second CC 510 may be configured.

The base station may transmit downlink transmissions via the first CC 505, which the UE may attempt to receive and decode. In this example, the UE may have eight HARQ processes configured, having HARQ IDs 1 through 8. Further, scheduling information provided in DCI 540 for physical downlink shared channel (PDSCH) transmissions 545 may include DAI information (e.g., a counter DAI (cDAI) and a total DAI (tDAI)) that may be used (e.g., along with control channel monitoring occasion information) to determine a codebook for providing HARQ feedback 515. The DCI 540 may also provide a HARQ ID and NDI indicator for scheduled PDSCH transmissions 545.

In this example, the UE may not successfully transmit the HARQ feedback 520, due to a failed LBT or interference from another transmitter, for example. In this example, the base station may provide a DCI with one-shot HARQ trigger 535 to the UE to trigger a one-shot group HARQ feedback report 550. In this example, the UE may also be configured to transmit a regular HARQ feedback report, which may be multiplexed with the one-shot HARQ feedback report in a multiplexed group HARQ feedback report 520. In this example, a first part 525 of the multiplexed group HARQ feedback report 520 may include information that would normally be transmitted based on HARQ configuration of the UE, and may include a second part 530 with the one-shot HARQ report. In this example, the first part 525 includes ACK/NACK information for downlink transmissions according to configured HARQ reporting and timelines (e.g., regular type 1 or type 2 HARQ codebooks based on cDAI, tDAI, control channel monitoring occasions, etc.), and one-shot HARQ report in the second part 530 may include feedback information for each configured HARQ ID (i.e., HARQ IDs 1 through 8), which may include one or more repeated HARQ indications for one or more HARQ IDs.

In some cases, the regular HARQ codebook and the one-shot HARQ report codebook may be multiplexed together (e.g., one-shot codebook is placed at the end of regular codebook). In some cases, the first part 525 and the second part 530 may be concatenated before encoding the payload (i.e., payload concatenation) or after encoding (e.g., two codebooks are separately encoded and then multiplexed). Further, in some cases, the regular codebook for part 1 525 may be CBG-based, or can be across multiple CCs, and the one-shot codebook for part 2 530 can correspond to only one CC (e.g., a requested CC either explicitly in the DCI, or based on scheduling/scheduled CC as discussed with reference to FIG. 3) and can be TB based. Note that in the example of FIG. 5, the feedback information for HARQ IDs 2,4,6,8 are reported in both the first part 525 and the second part 530. Further, in this example, for HARQ ID 2, NACK is reported in the dynamic codebook for the first part 525 (since DCI is missed), and the feedback of the previous NDI is reported in one-shot codebook.

Alternatively, in some cases, when regular HARQ feedback is multiplexed together with one-shot HARQ feedback, the UE may drop the regular HARQ feedback codebook and only report the one-shot HARQ report. In some cases, the base station may configure this option when the HARQ IDs involved in the regular HARQ are fully covered by the one-shot HARQ report, such as if the one-shot HARQ triggers reporting of all HARQ IDs for all CCs. In other cases, regular HARQ feedback and the one-shot HARQ report may be reported together but in separate resources instead of with payload concatenation. In such cases, additional resources may be configured for the one-shot HARQ report. For example, a PUCCH resource indicator (PRI) may be linked to the regular HARQ feedback and to the one-shot HARQ report. In such cases, when the one-shot HARQ report is triggered in addition to the regular HARQ feedback, the PRI in the DCI can point to a resource pair for regular HARQ feedback and one-shot HARQ feedback. Similarly, the feedback delay value K1 may point to a pair of timelines for regular HARQ feedback and one-shot HARQ feedback, and the set of the resource pair and K1 pair can be pre-configured (e.g., via RRC). In such cases, when both regular and one-shot HARQ feedback are triggered, PRI and K1 point to the entry in the set with the resource/K1 pair defined, and when only regular or one-shot HARQ feedback is triggered, PRI and K1 point to the entry in the set without resource/K1 pair definition.

Figure 6:
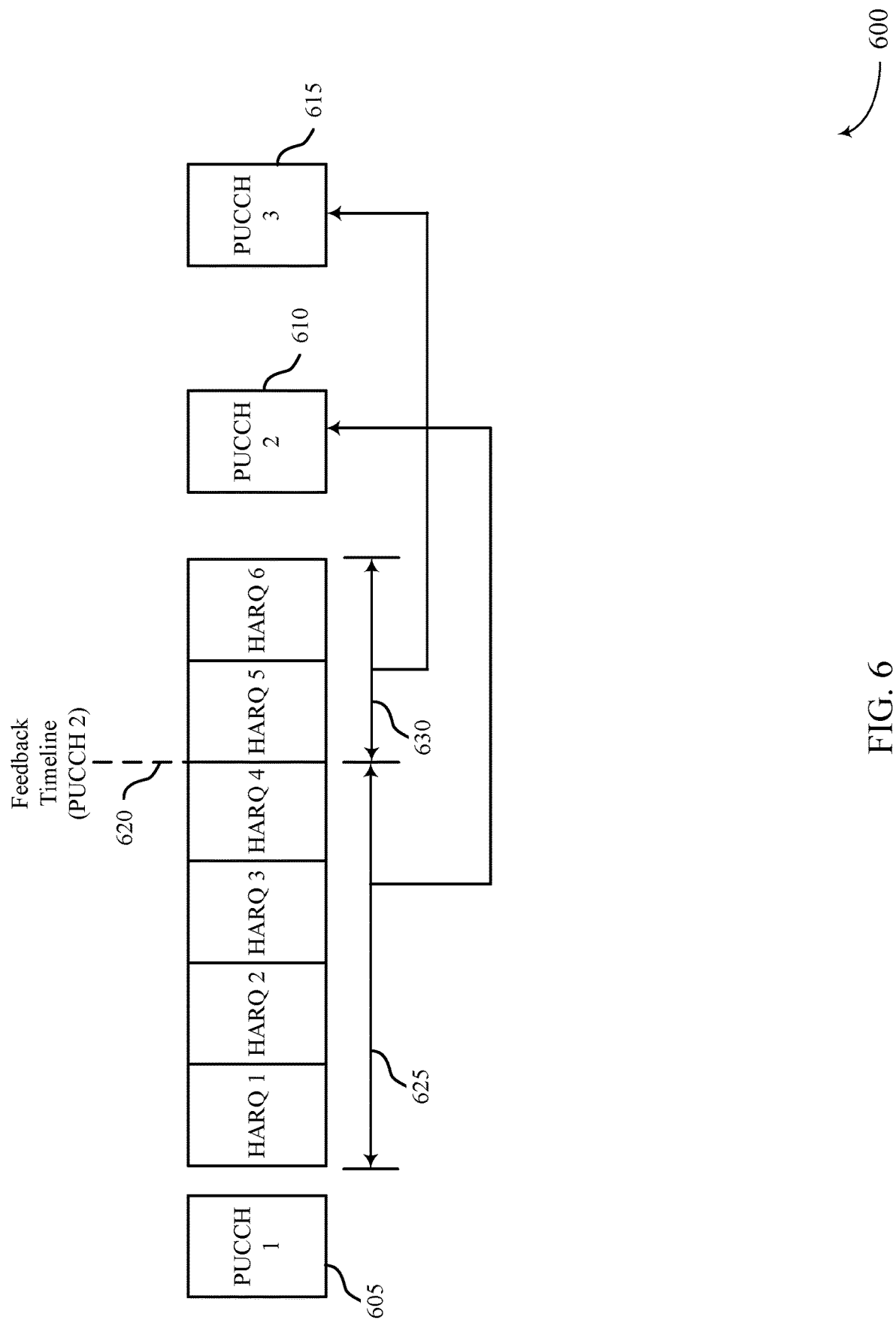
FIG. 6 illustrates an example of feedback timing that supports acknowledgment feedback techniques in shared radio frequency spectrum in accordance with aspects of the present disclosure.

FIG. 6 illustrates an example of a feedback timing 600 that supports acknowledgment feedback techniques in shared radio frequency spectrum in accordance with aspects of the present disclosure. In some examples, feedback timing 600 may implement aspects of wireless communications system 100 or 200. In this example, a UE (e.g., a UE 115 of FIG. 1 or 2) and a base station (e.g., a base station 105 of FIG. 1 or 2) may establish communications (e.g., via one or multiple CCs) for downlink transmissions, uplink transmissions, or both. In this example, UE may transmit a first PUCCH 605, second PUCCH 610, and third PUCCH 615, and the base station may transmit first PDSCH 625 transmissions for HARQ IDs 1 through 4, and second PDSCH 630 transmissions for HARQ IDs 5 and 6.

For regular HARQ transmissions, a value of K1 may be used to indicate the time between PDSCH-to-HARQ in terms of number of slots, which in this example is indicated as feedback timeline 620. Thus, in this case HARQ IDs 1 through 4 may have feedback provided in the second PUCCH 610 transmission, and HARQ IDs 5 and 6 may have feedback provided in the third PUCCH 615 transmission. For one-shot HARQ reports, the UE reports feedback for all HARQ IDs, and using the rules for regular HARQ transmissions may introduce ambiguity for what is the last PDSCH that the UE has to complete the decoding and reporting the HARQ feedback. For example, there may be 8 configured HARQ IDs, and HARQ IDs 1-6 are scheduled back to back, as illustrated in FIG. 6, and one-shot feedback is only requested in the DCIs scheduling PDSCH with HARQ IDs 2,3,4. At the time of scheduling PDSCH for HARQ ID 1, the base station has not finished decoding the previous PUCCH, so does not know if a one-shot HARQ feedback is needed. In such a case, one-shot feedback may be requested in the next 3 DCIs (e.g., in response to not being able to decode PUCCH1). However, with the last two DCIs having a K1 pointing to another PUCCH there is no need to request one-shot feedback for that PUCCH yet.

In the example of FIG. 6, the last PDSCH for which HARQ results is reported in one-shot HARQ feedback is the PDSCH that is scheduled by the last DCI among all the DCIs in which one-shot feedback is requested and points to the same slot for PUCCH transmission. For example, for one-shot feedback in the second PUCCH 610, the last PDSCH is associated with HARQ ID 4. For HARQ IDs 5 and 6, the HARQ feedback for the previous PDSCH is reported (i.e., the UE does not include feedback of the last two PDSCHs in the one-shot HARQ feedback in the second PUCCH 610). In this example, it is assumed that the request is carried in a UE-specific DCI carrying a PDSCH assignment. In other cases (DCI requesting one-shot feedback does not carry PDSCH assignment), the last PDSCH for which HARQ results is reported in one-shot HARQ-Ack feedback is either the last PDSCH that is scheduled or received before the last DCI among all the DCIs in which one-shot feedback is requested and points to the same slot for HARQ-Ack transmission.

Figure 7:
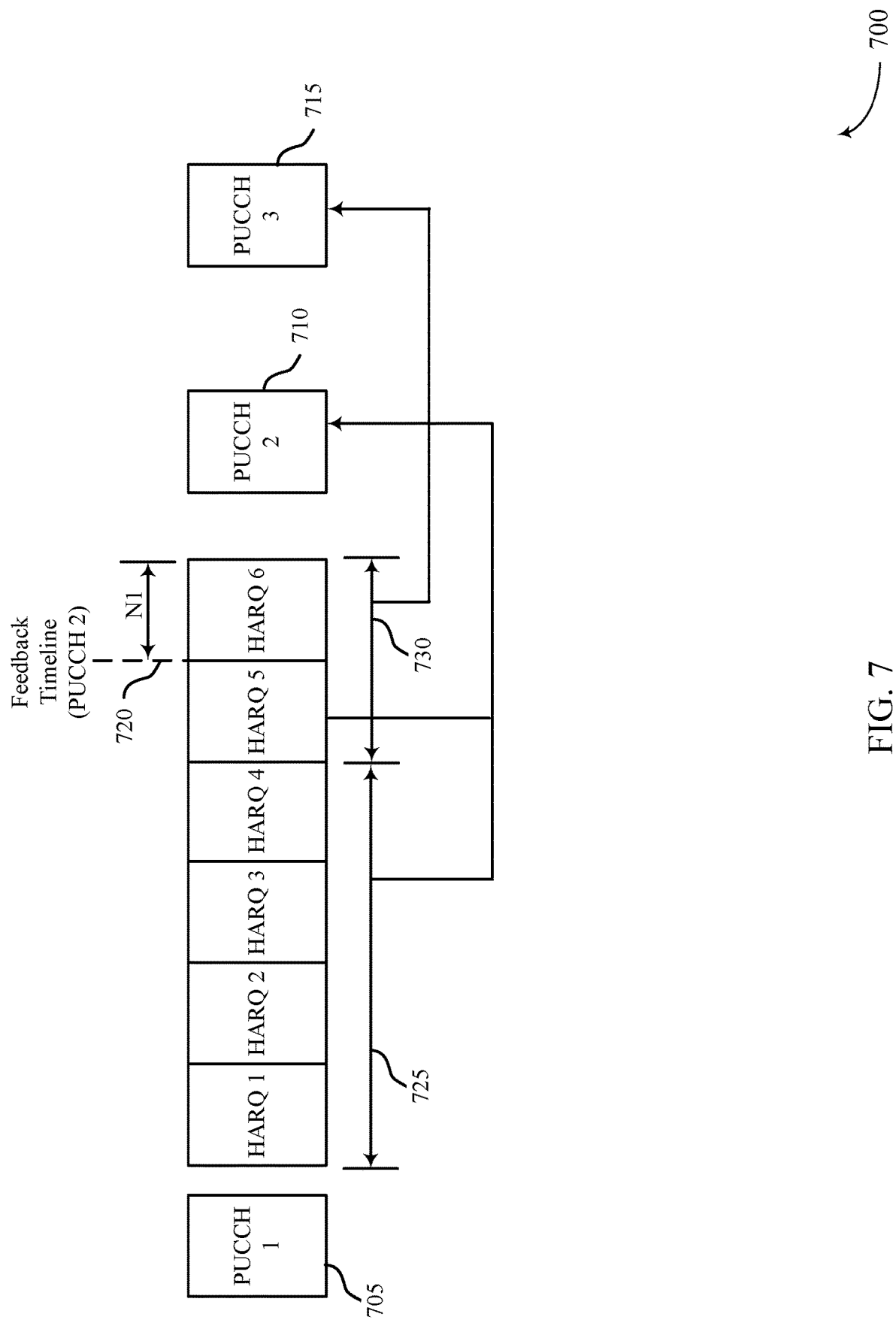
FIG. 7 illustrates an example of feedback timing that supports acknowledgment feedback techniques in shared radio frequency spectrum in accordance with aspects of the present disclosure.

FIG. 7 illustrates an example of a feedback timing 700 that supports acknowledgment feedback techniques in shared radio frequency spectrum in accordance with aspects of the present disclosure. In some examples, feedback timing 700 may implement aspects of wireless communications system 100 or 200. In this example, a UE (e.g., a UE 115 of FIG. 1 or 2) and a base station (e.g., a base station 105 of FIG. 1 or 2) may establish communications (e.g., via one or multiple CCs) for downlink transmissions, uplink transmissions, or both. In this example, UE may transmit a first PUCCH 705, second PUCCH 710, and third PUCCH 715, and the base station may transmit first PDSCH 725 transmissions for HARQ IDs 1 through 4, and second PDSCH 730 transmissions for HARQ IDs 5 and 6.

In this example, when a one-shot HARQ request is received, the UE may report the latest HARQ result only if a timeline condition N1 is satisfied, which may be a function of UE processing capability (e.g., the value of N1 based on UE capability indication (i.e., capability 1 or capability 2)). In this case, the UE counts back N1 symbols from the first symbol of the second PUCCH 710, and HARQ feedback for any PDSCH before that should be reported in one-shot feedback. In the example of FIG. 7, the UE would report HARQ IDs 1 through 5 in the one-shot HARQ report that is transmitted in the second PUCCH 710. In cases where HARQ feedback is carried on PUSCH, the first symbol of PUSCH is considered for the N1 determination. In the example of FIG. 7, the downlink transmission associated with HARQ ID 5 is transmitted in both the one-shot HARQ report, as well as in the regular HARQ report provided in the third PUCCH transmission 715. In this example, HARQ ID 6, HARQ information of the previous PDSCH (e.g. received before PUCCH1) is reported in the one-shot feedback. In some cases, the symbol to use for the N1 timeline determination may be an actual PUCCH/PUSCH transmission after uplink control information (UCI) multiplexing is considered. Alternatively, the PUCCH that the HARQ information was originally intended to be transmitted on is considered before UCI multiplexing if present (i.e., the PUCCH resource indicated by PRI field in the last DCI among all the DCIs that have a value of K1 indicating a same slot for PUCCH transmission). In further cases, the two first symbols according to the two above alternatives are determined, and the earliest symbol from the two is considered for the N1 determination.

Figure 8:
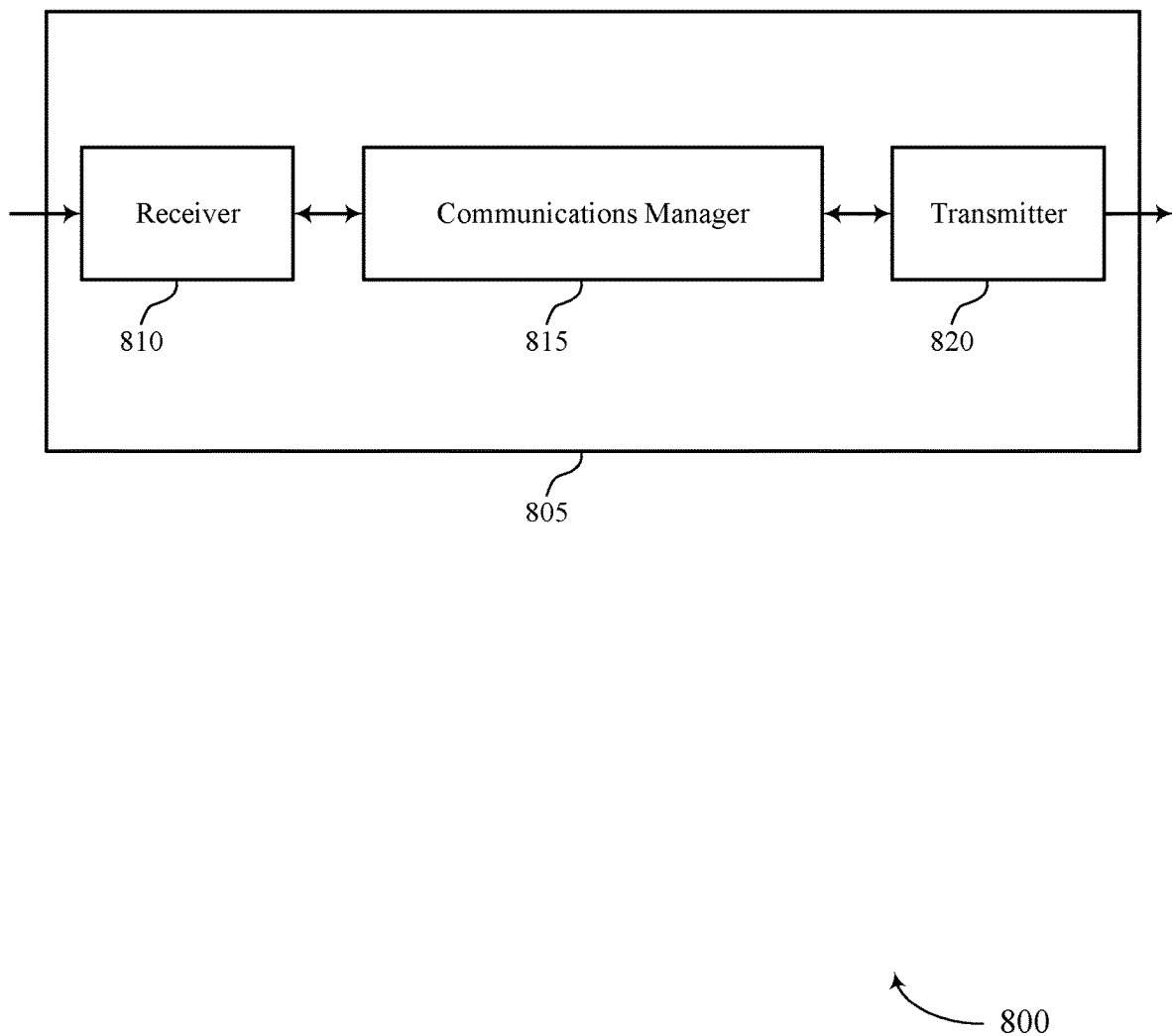
FIGS. 8 and 9 show block diagrams of devices that support acknowledgment feedback techniques in shared radio frequency spectrum in accordance with aspects of the present disclosure.

FIG. 8 shows a block diagram 800 of a device 805 that supports acknowledgment feedback techniques in shared radio frequency spectrum in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to acknowledgment feedback techniques in shared radio frequency spectrum, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may determine HARQ feedback for a set of downlink transmissions from a base station, receive, from the base station, downlink control information that indicates the UE is to provide a feedback report for a subset of downlink transmissions, where the subset of downlink transmissions is less than the set of downlink transmissions, and transmit, to the base station, the feedback report including the HARQ feedback for the subset of downlink transmissions.

The communications manager 815 may also determine HARQ feedback for a set of downlink transmissions from a base station, where each of the set of downlink transmissions has an associated data indicator that indicates whether the downlink transmission includes an initial transmission of a transport block or a retransmission of a previously transmitted transport block, receive, from the base station, downlink control information that indicates the UE is to provide a feedback report for at least a subset of the downlink transmissions, identify, for each downlink transmission of at least the subset of downlink transmissions, associated HARQ feedback based on one or more of a three-state indication of HARQ feedback, a default data indicator, or any combinations thereof, and transmit, to the base station, the feedback report including the HARQ feedback for at least the subset of the downlink transmissions.

The communications manager 815 may also receive, from a base station, a resource allocation for a first subset of downlink transmissions, receive, from the base station, downlink control information that indicates the UE is to provide a second feedback report for a second subset of downlink transmissions, where the second subset of downlink transmissions includes one or more different downlink transmissions than the first subset of downlink transmissions, determine that HARQ feedback for one or more of the first subset of downlink transmissions is to be provided in a first feedback report, determine a first subset of HARQ feedback for the first subset of downlink transmissions and a second subset of HARQ feedback for the second subset of downlink transmissions, and transmit, to the base station, the first subset of HARQ feedback multiplexed with the second subset of HARQ feedback in one or more feedback reports.

The communications manager 815 may also receive, from a base station, downlink control information that indicates the UE is to provide a feedback report for a set of downlink transmissions, determine HARQ feedback for the set of downlink transmissions from the base station, format the feedback report for transmission to the base station, where a last downlink transmission of the set of downlink transmissions to be included in the feedback report is determined based on a timing the downlink control information that schedules the set of downlink transmissions, a latest downlink transmission that meets a feedback timeline condition, or any combinations thereof, and transmit, to the base station, the feedback report including the HARQ feedback for the set of the downlink transmissions. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
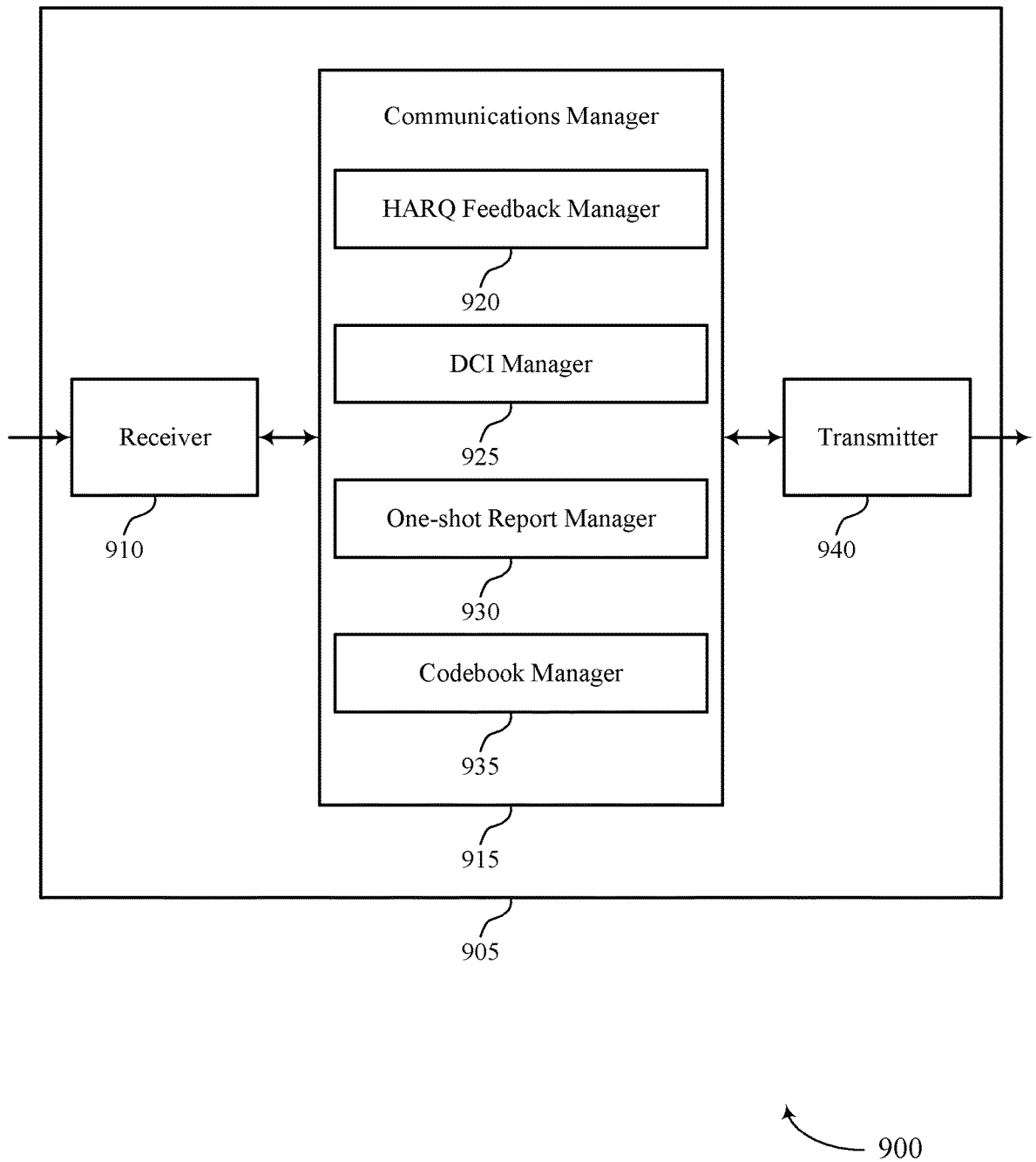

FIG. 9 shows a block diagram 900 of a device 905 that supports acknowledgment feedback techniques in shared radio frequency spectrum in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to acknowledgment feedback techniques in shared radio frequency spectrum, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a HARQ feedback manager 920, a DCI manager 925, an one-shot report manager 930, and a codebook manager 935. The communications manager 915 may be an example of aspects of the communications manager 1110 described herein.

The HARQ feedback manager 920 may determine HARQ feedback for a set of downlink transmissions from a base station. The DCI manager 925 may receive, from the base station, downlink control information that indicates the UE is to provide a feedback report for a subset of downlink transmissions, where the subset of downlink transmissions is less than the set of downlink transmissions. The one-shot report manager 930 may transmit, to the base station, the feedback report including the HARQ feedback for the subset of downlink transmissions.

In some cases, the HARQ feedback manager 920 may determine HARQ feedback for a set of downlink transmissions from a base station, where each of the set of downlink transmissions has an associated data indicator that indicates whether the downlink transmission includes an initial transmission of a transport block or a retransmission of a previously transmitted transport block. The DCI manager 925 may receive, from the base station, downlink control information that indicates the UE is to provide a feedback report for at least a subset of the downlink transmissions. The codebook manager 935 may identify, for each downlink transmission of at least the subset of downlink transmissions, associated HARQ feedback based on one or more of a three-state indication of HARQ feedback, a default data indicator, or any combinations thereof. The one-shot report manager 930 may transmit, to the base station, the feedback report including the HARQ feedback for at least the subset of the downlink transmissions.

In some cases, the DCI manager 925 may receive, from a base station, a resource allocation for a first subset of downlink transmissions and receive, from the base station, downlink control information that indicates the UE is to provide a second feedback report for a second subset of downlink transmissions, where the second subset of downlink transmissions includes one or more different downlink transmissions than the first subset of downlink transmissions. The HARQ feedback manager 920 may determine that HARQ feedback for one or more of the first subset of downlink transmissions is to be provided in a first feedback report and determine a first subset of HARQ feedback for the first subset of downlink transmissions and a second subset of HARQ feedback for the second subset of downlink transmissions. The one-shot report manager 930 may transmit, to the base station, the first subset of HARQ feedback multiplexed with the second subset of HARQ feedback in one or more feedback reports.

In some cases, the DCI manager 925 may receive, from a base station, downlink control information that indicates the UE is to provide a feedback report for a set of downlink transmissions. The HARQ feedback manager 920 may determine HARQ feedback for the set of downlink transmissions from the base station. The one-shot report manager 930 may format the feedback report for transmission to the base station, where a last downlink transmission of the set of downlink transmissions to be included in the feedback report is determined based on a timing the downlink control information that schedules the set of downlink transmissions, a latest downlink transmission that meets a feedback timeline condition, or any combinations thereof and transmit, to the base station, the feedback report including the HARQ feedback for the set of the downlink transmissions.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
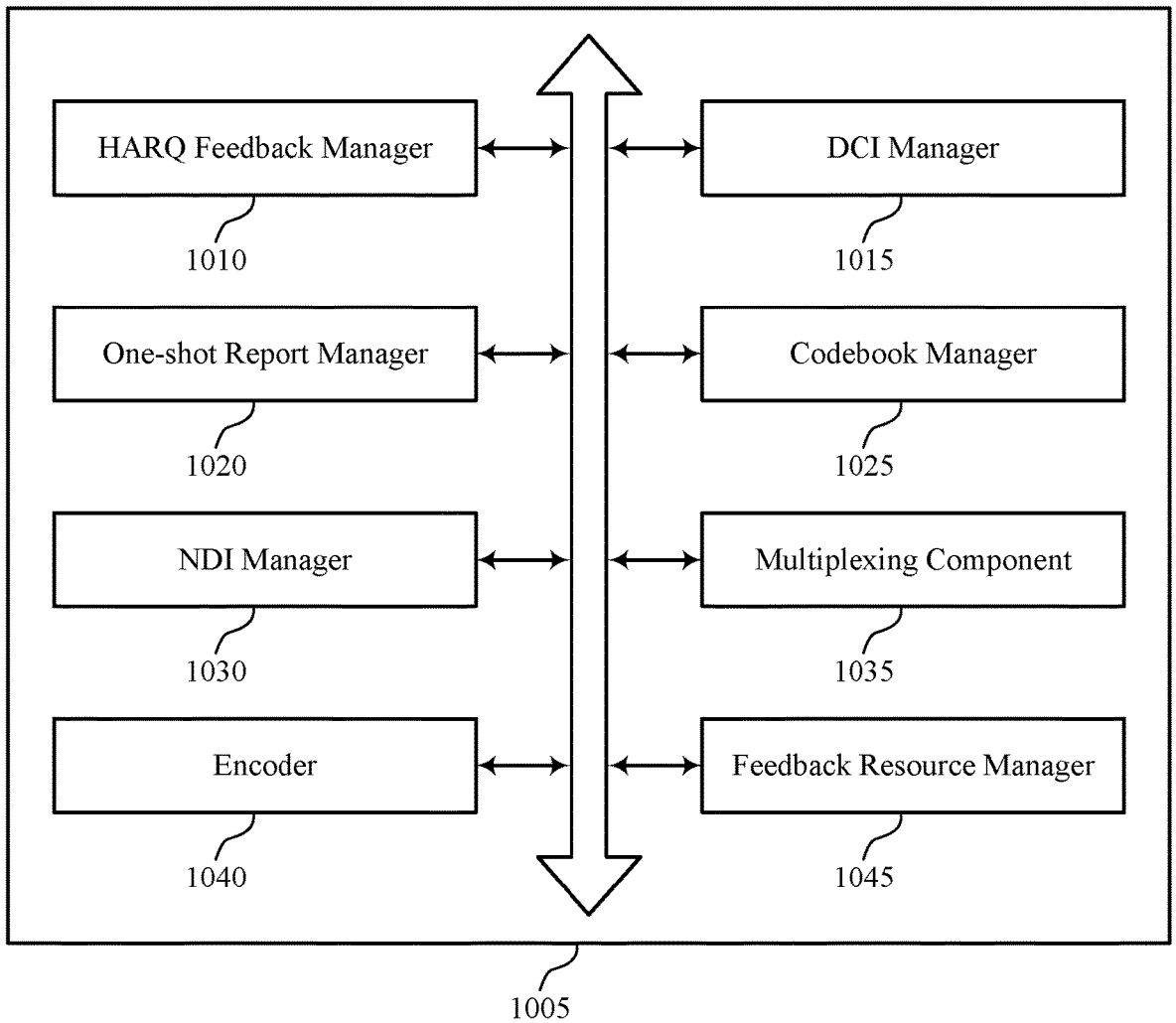
FIG. 10 shows a block diagram of a communications manager that supports acknowledgment feedback techniques in shared radio frequency spectrum in accordance with aspects of the present disclosure.

FIG. 10 shows a block diagram 1000 of a communications manager 1005 that supports acknowledgment feedback techniques in shared radio frequency spectrum in accordance with aspects of the present disclosure. The communications manager 1005 may be an example of aspects of a communications manager 815, a communications manager 915, or a communications manager 1110 described herein. The communications manager 1005 may include a HARQ feedback manager 1010, a DCI manager 1015, an one-shot report manager 1020, a codebook manager 1025, a NDI manager 1030, a multiplexing component 1035, an encoder 1040, and a feedback resource manager 1045. Each of these modules may communicate, directly or indirectly, with one another (e.g., via one or more buses).

The HARQ feedback manager 1010 may determine HARQ feedback for a set of downlink transmissions from a base station. In some examples, the HARQ feedback manager 1010 may determine HARQ feedback for a set of downlink transmissions from a base station, where each of the set of downlink transmissions has an associated data indicator that indicates whether the downlink transmission includes an initial transmission of a transport block or a retransmission of a previously transmitted transport block. In some examples, the HARQ feedback manager 1010 may determine that HARQ feedback for one or more of the first subset of downlink transmissions is to be provided in a first feedback report. In some examples, the HARQ feedback manager 1010 may determine a first subset of HARQ feedback for the first subset of downlink transmissions and a second subset of HARQ feedback for the second subset of downlink transmissions.

In some examples, the HARQ feedback manager 1010 may determine HARQ feedback for the set of downlink transmissions from the base station. In some examples, the HARQ feedback manager 1010 may transmit the first subset of HARQ feedback using a first set of uplink resources. In some examples, the HARQ feedback manager 1010 may transmit the second subset of HARQ feedback using a second set of uplink resources.

In some cases, the HARQ feedback includes one or more of acknowledgment (ACK) indications, negative acknowledgment (NACK) indications, a new data indicator (NDI), or combinations thereof, that are each associated with a corresponding downlink transmission of the set of downlink transmissions.

The DCI manager 1015 may receive, from the base station, downlink control information that indicates the UE is to provide a feedback report for a subset of downlink transmissions, where the subset of downlink transmissions is less than the set of downlink transmissions. In some examples, the DCI manager 1015 may receive, from the base station, downlink control information that indicates the UE is to provide a feedback report for at least a subset of the downlink transmissions. In some examples, the DCI manager 1015 may receive, from a base station, a resource allocation for a first subset of downlink transmissions. In some examples, the DCI manager 1015 may receive, from the base station, downlink control information that indicates the UE is to provide a second feedback report for a second subset of downlink transmissions, where the second subset of downlink transmissions includes one or more different downlink transmissions than the first subset of downlink transmissions. In some examples, the DCI manager 1015 may receive, from a base station, downlink control information that indicates the UE is to provide a feedback report for a set of downlink transmissions.

In some examples, the DCI manager 1015 may receive a set of information fields in the downlink control information. In some examples, the DCI manager 1015 may determine, based on a first information field of the set of information fields, the subset of downlink transmissions to be included with the feedback report.

In some cases, the set of downlink transmissions include a set of downlink transmissions that are associated with one or more of a set of transport blocks, a set of component carriers, a set of feedback process identifications, a set of code block groups, or any combinations thereof. In some cases, the first set of uplink resources and second set of uplink resources are indicated in the downlink control information.

The one-shot report manager 1020 may transmit, to the base station, the feedback report including the HARQ feedback for the subset of downlink transmissions. In some examples, the one-shot report manager 1020 may transmit, to the base station, the first subset of HARQ feedback multiplexed with the second subset of HARQ feedback in one or more feedback reports. In some examples, the one-shot report manager 1020 may format the feedback report for transmission to the base station, where a last downlink transmission of the set of downlink transmissions to be included in the feedback report is determined based on a timing the downlink control information that schedules the set of downlink transmissions, a latest downlink transmission that meets a feedback timeline condition, or any combinations thereof.

In some examples, the one-shot report manager 1020 may format first and second codebook entries into first and second feedback reports. In some examples, the one-shot report manager 1020 may transmit the feedback reports to the base station.

In some examples, the one-shot report manager 1020 may determine the last downlink transmission as a latest downlink transmission that scheduled in the downlink control information. In some examples, the one-shot report manager 1020 may determine the last downlink transmission as a latest downlink transmission that scheduled in one of two or more different downlink control information transmissions in which the feedback report is requested and that indicates a same set of uplink resources for transmitting the feedback report. In some examples, the one-shot report manager 1020 may determine the last downlink transmission as a latest downlink transmission that is received prior to receiving the downlink control information. In some examples, the one-shot report manager 1020 may determine the last downlink transmission as a latest downlink transmission that satisfies the feedback timeline condition, and where the feedback timeline condition indicates a minimum time duration between receiving a downlink transmission and transmitting associated HARQ feedback.

In some cases, the first information field provides an explicit indication of the subset of downlink transmissions to be included with the feedback report. In some cases, the explicit indication specifies one or more component carriers, transport blocks, feedback process identifications, code blocks, or any combinations thereof to be included with the feedback report. In some cases, the first information field provides an implicit indication of the subset of downlink transmissions to be included with the feedback report. In some cases, the implicit indication is based on one or more component carriers (CCs) scheduled in the downlink control information, a CC used to transmit the downlink control information, or any combinations thereof. In some cases, the first field is a downlink assignment indicator field that is reused to indicate the subset of downlink transmissions to be included with the feedback report.

In some cases, the first subset of HARQ feedback includes HARQ feedback for at least a first downlink transmission, and the second subset of HARQ feedback also includes the HARQ feedback for at least the first downlink transmission.

In some cases, a first symbol of a set of uplink resources for transmitting the feedback report is selected for determining the minimum time duration, and where the first symbol of the set of uplink resources is determined based on one or more of uplink control information multiplexing of the feedback report with other uplink control information, or an uplink control channel resource indicator provided with the downlink control information.

The codebook manager 1025 may identify, for each downlink transmission of at least the subset of downlink transmissions, associated HARQ feedback based on one or more of a three-state indication of HARQ feedback, a default data indicator, or any combinations thereof. In some examples, the codebook manager 1025 may identify a codebook entry associated with the acknowledgment feedback for a set of feedback process identifications to be reported in the feedback report.

In some examples, the codebook manager 1025 may identify a first codebook entry associated with the first subset of HARQ feedback, where the first codebook entry is mapped to the first subset of HARQ feedback and one or more parameters associated with the first subset of downlink transmissions. In some examples, the codebook manager 1025 may identify a second codebook entry associated with the second subset of acknowledgment feedback, where the second codebook entry is mapped to the second subset of HARQ feedback and one or more different parameters than the first codebook entry. In some examples, the codebook manager 1025 may identify a second codebook entry associated with the second subset of HARQ feedback based on the multiplexed set of HARQ feedback.

The NDI manager 1030 may manage NDI information associated with HARQ IDs. In some cases, a default data indication is reported for a first feedback process identification for which the UE has not received scheduling information that indicates the first feedback process identification is to be used to indicate feedback for one of the subset of the downlink transmissions.

The multiplexing component 1035 may concatenate the second feedback report with the first feedback report. In some examples, the multiplexing component 1035 may multiplex the first subset of HARQ feedback and the second subset of HARQ feedback to generate a multiplexed set of HARQ feedback. The encoder 1040 may encode a payload of each of the first feedback report and the second feedback report, where the encoding is performed before or after the concatenating.

The feedback resource manager 1045 may identify uplink resources for HARQ transmissions. In some cases, the downlink control information provides an uplink control channel resource indicator that is mapped to the first set of uplink resources and the second set of uplink resources. In some cases, a timeline for transmissions using the first set of uplink resources and second set of uplink resources is indicated by a feedback timing indicator that is mapped to time domain resources of the first set of uplink resources and second set of uplink resources.

Figure 11:
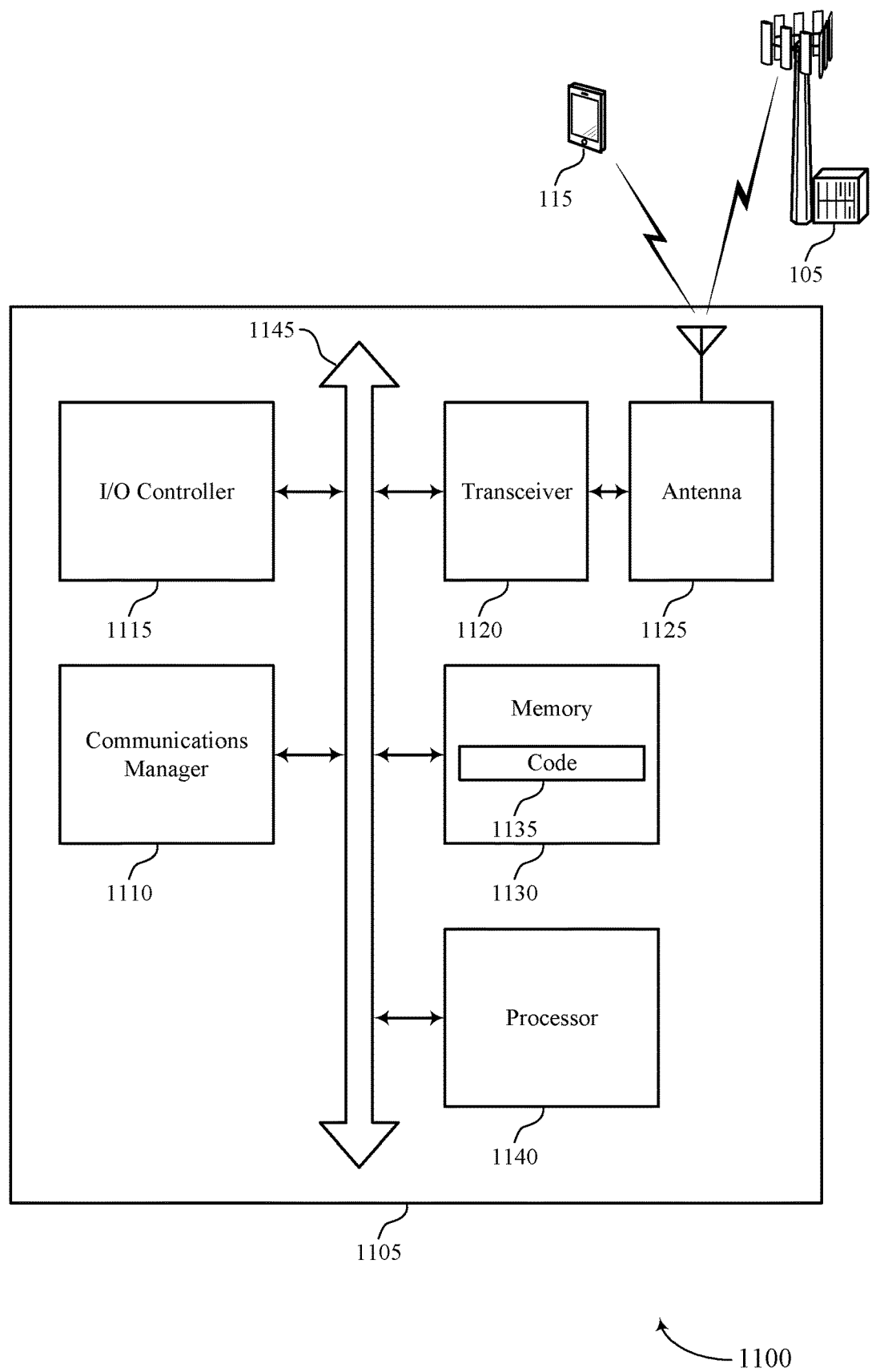
FIG. 11 shows a diagram of a system including a device that supports acknowledgment feedback techniques in shared radio frequency spectrum in accordance with aspects of the present disclosure.

FIG. 11 shows a diagram of a system 1100 including a device 1105 that supports acknowledgment feedback techniques in shared radio frequency spectrum in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may determine HARQ feedback for a set of downlink transmissions from a base station, receive, from the base station, downlink control information that indicates the UE is to provide a feedback report for a subset of downlink transmissions, where the subset of downlink transmissions is less than the set of downlink transmissions, and transmit, to the base station, the feedback report including the HARQ feedback for the subset of downlink transmissions.

The communications manager 1110 may also determine HARQ feedback for a set of downlink transmissions from a base station, where each of the set of downlink transmissions has an associated data indicator that indicates whether the downlink transmission includes an initial transmission of a transport block or a retransmission of a previously transmitted transport block, receive, from the base station, downlink control information that indicates the UE is to provide a feedback report for at least a subset of the downlink transmissions, identify, for each downlink transmission of at least the subset of downlink transmissions, associated HARQ feedback based on one or more of a three-state indication of HARQ feedback, a default data indicator, or any combinations thereof, and transmit, to the base station, the feedback report including the HARQ feedback for at least the subset of the downlink transmissions.

The communications manager 1110 may also receive, from a base station, a resource allocation for a first subset of downlink transmissions, receive, from the base station, downlink control information that indicates the UE is to provide a second feedback report for a second subset of downlink transmissions, where the second subset of downlink transmissions includes one or more different downlink transmissions than the first subset of downlink transmissions, determine that HARQ feedback for one or more of the first subset of downlink transmissions is to be provided in a first feedback report, determine a first subset of HARQ feedback for the first subset of downlink transmissions and a second subset of HARQ feedback for the second subset of downlink transmissions, and transmit, to the base station, the first subset of HARQ feedback multiplexed with the second subset of HARQ feedback in one or more feedback reports.

The communications manager 1110 may also receive, from a base station, downlink control information that indicates the UE is to provide a feedback report for a set of downlink transmissions, determine HARQ feedback for the set of downlink transmissions from the base station, format the feedback report for transmission to the base station, where a last downlink transmission of the set of downlink transmissions to be included in the feedback report is determined based on a timing the downlink control information that schedules the set of downlink transmissions, a latest downlink transmission that meets a feedback timeline condition, or any combinations thereof, and transmit, to the base station, the feedback report including the HARQ feedback for the set of the downlink transmissions.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting acknowledgment feedback techniques in shared radio frequency spectrum).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
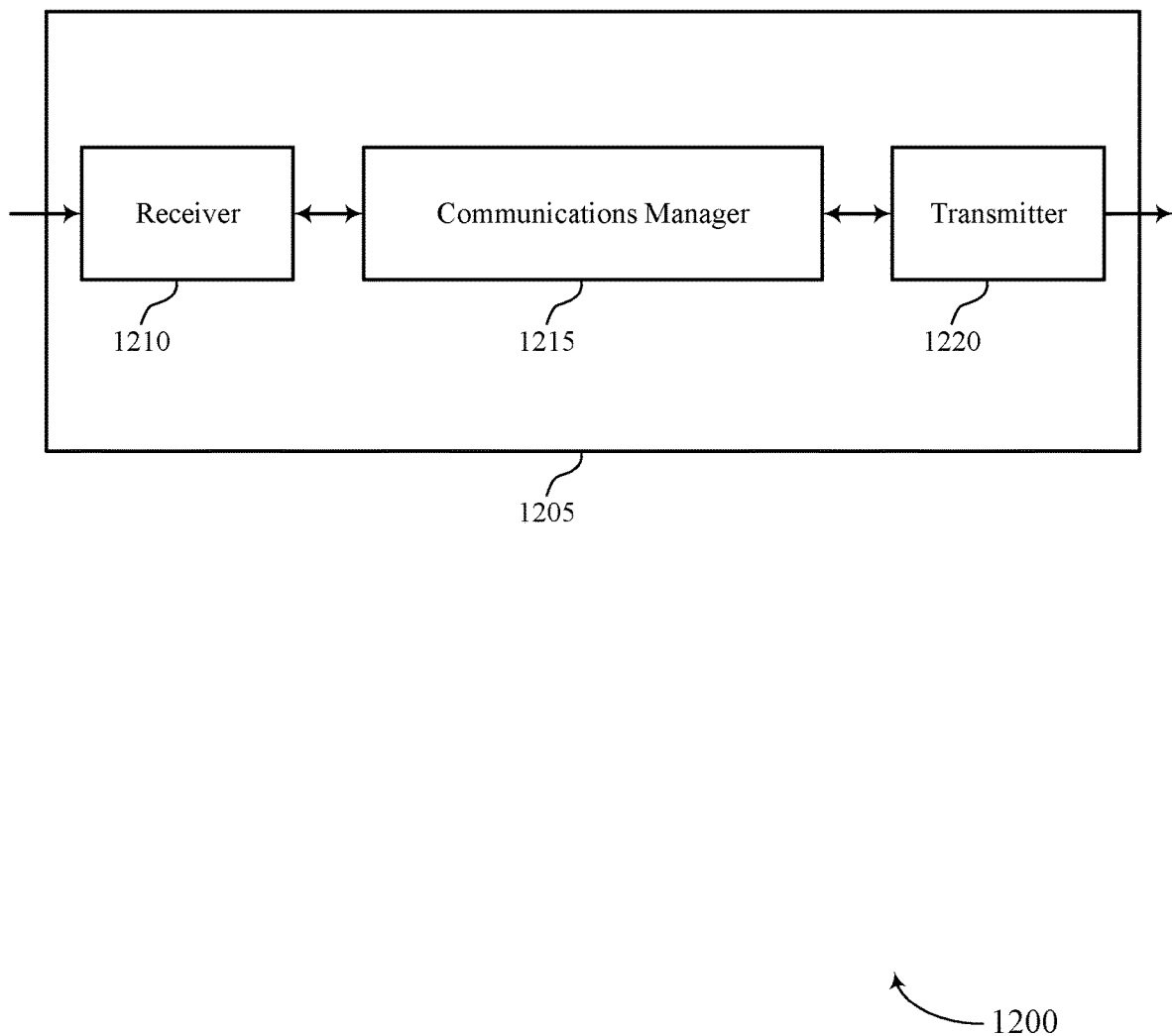
FIGS. 12 and 13 show block diagrams of devices that support acknowledgment feedback techniques in shared radio frequency spectrum in accordance with aspects of the present disclosure.

FIG. 12 shows a block diagram 1200 of a device 1205 that supports acknowledgment feedback techniques in shared radio frequency spectrum in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to acknowledgment feedback techniques in shared radio frequency spectrum, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit a set of downlink transmissions to a UE, the set of downlink transmissions having one or more corresponding sets of uplink resources for transmission of HARQ feedback from the UE, determine, based on monitoring the one or more sets of uplink resources, that HARQ feedback from the UE is missing for one or more downlink transmissions of the set of downlink transmissions, and transmit, to the UE, downlink control information that indicates the UE is to provide a feedback report for a subset of downlink transmissions, where the subset of downlink transmissions is less than the set of downlink transmissions.

The communications manager 1215 may also configure a UE for reporting HARQ feedback that indicates successful or unsuccessful reception of one or more downlink transmissions at the UE, where each downlink transmission has an associated data indicator that indicates whether the downlink transmission includes an initial transmission of a transport block or a retransmission of a previously transmitted transport block, and where the HARQ feedback indicates one or more of a default data indication, a three-state indication of feedback based on an acknowledgment (ACK) and transport block indication or a negative acknowledgment (NACK) indication, or combinations thereof, transmit a set of downlink transmissions to the UE, the set of downlink transmissions having one or more corresponding sets of uplink resources for transmission of HARQ feedback from the UE, determine, based on monitoring the one or more sets of uplink resources, that HARQ feedback from the UE is missing for one or more downlink transmissions of the set of downlink transmissions, transmit, to the UE, downlink control information that indicates the UE is to provide a feedback report for at least the one or more downlink transmissions, and receive, from the UE, the feedback report that indicates, for each of the one or more downlink transmissions, one or more of the three-state indication of feedback, the default data indication, or any combinations thereof.

The communications manager 1215 may also transmit a first subset of downlink transmissions to a UE, the first subset of downlink transmissions having one or more corresponding sets of uplink resources for transmission of HARQ feedback from the UE, determine, based on monitoring the one or more sets of uplink resources, that HARQ feedback from the UE is missing for one or more downlink transmissions of the first subset of downlink transmissions, transmit, to the UE, downlink control information that includes a resource allocation for second subset of downlink transmissions and that indicates that the UE is to provide a first feedback report for the first subset of downlink transmissions, and where the second subset of downlink transmissions have an associated second feedback report, and receive, from the UE, the first feedback report multiplexed with the second feedback report in one or more uplink control information transmissions.

The communications manager 1215 may also transmit, to a UE, downlink control information that indicates the UE is to provide a feedback report for a set of downlink transmissions, receive the feedback report from the UE, where a last downlink transmission of the set of downlink transmissions that is included in the feedback report is determined based on a timing the downlink control information that schedules the set of downlink transmissions, a latest downlink transmission that meets a feedback timeline condition, or any combinations thereof, and determine HARQ feedback based on the feedback report. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
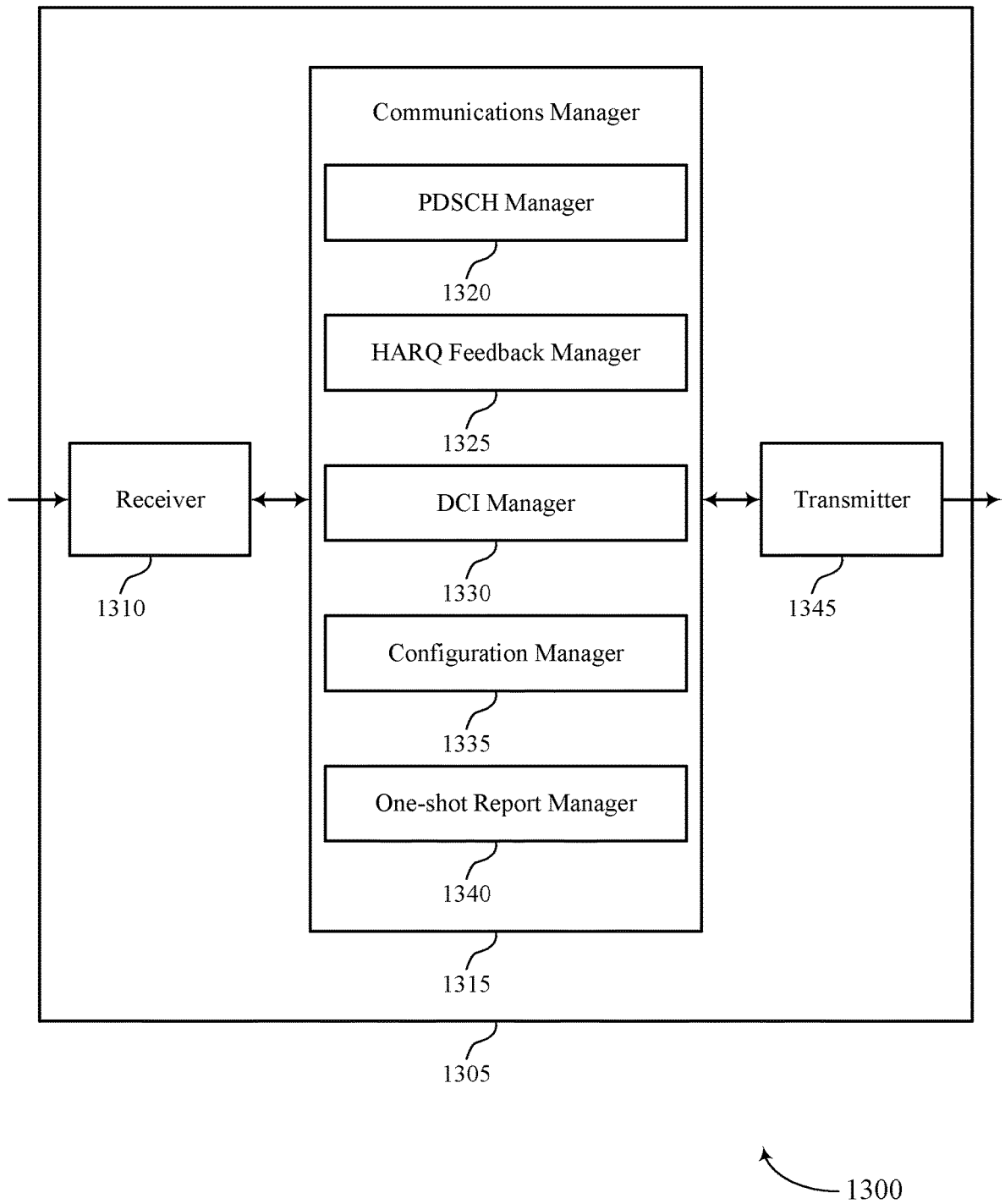

FIG. 13 shows a block diagram 1300 of a device 1305 that supports acknowledgment feedback techniques in shared radio frequency spectrum in accordance with aspects of the present disclosure. The device 1305 may be an example of aspects of a device 1205, or a base station 105 as described herein. The device 1305 may include a receiver 1310, a communications manager 1315, and a transmitter 1345. The device 1305 may also include a processor. Each of these components may be in communication with one another (e.g., via one or more buses).

The receiver 1310 may receive information such as packets, user data, or control information associated with various information channels (e.g., control channels, data channels, and information related to acknowledgment feedback techniques in shared radio frequency spectrum, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a PDSCH manager 1320, a HARQ feedback manager 1325, a DCI manager 1330, a configuration manager 1335, and an one-shot report manager 1340. The communications manager 1315 may be an example of aspects of the communications manager 1510 described herein.

In some cases, the PDSCH manager 1320 may transmit a set of downlink transmissions to a UE, the set of downlink transmissions having one or more corresponding sets of uplink resources for transmission of HARQ feedback from the UE. The HARQ feedback manager 1325 may determine, based on monitoring the one or more sets of uplink resources, that HARQ feedback from the UE is missing for one or more downlink transmissions of the set of downlink transmissions. The DCI manager 1330 may transmit, to the UE, downlink control information that indicates the UE is to provide a feedback report for a subset of downlink transmissions, where the subset of downlink transmissions is less than the set of downlink transmissions.

In some cases, the configuration manager 1335 may configure a UE for reporting HARQ feedback that indicates successful or unsuccessful reception of one or more downlink transmissions at the UE, where each downlink transmission has an associated data indicator that indicates whether the downlink transmission includes an initial transmission of a transport block or a retransmission of a previously transmitted transport block, and where the HARQ feedback indicates one or more of a default data indication, a three-state indication of feedback based on an acknowledgment (ACK) and transport block indication or a negative acknowledgment (NACK) indication, or combinations thereof. The PDSCH manager 1320 may transmit a set of downlink transmissions to the UE, the set of downlink transmissions having one or more corresponding sets of uplink resources for transmission of HARQ feedback from the UE. The HARQ feedback manager 1325 may determine, based on monitoring the one or more sets of uplink resources, that HARQ feedback from the UE is missing for one or more downlink transmissions of the set of downlink transmissions. The DCI manager 1330 may transmit, to the UE, downlink control information that indicates the UE is to provide a feedback report for at least the one or more downlink transmissions. The one-shot report manager 1340 may receive, from the UE, the feedback report that indicates, for each of the one or more downlink transmissions, one or more of the three-state indication of feedback, the default data indication, or any combinations thereof.

In some cases, the PDSCH manager 1320 may transmit a first subset of downlink transmissions to a UE, the first subset of downlink transmissions having one or more corresponding sets of uplink resources for transmission of HARQ feedback from the UE. The HARQ feedback manager 1325 may determine, based on monitoring the one or more sets of uplink resources, that HARQ feedback from the UE is missing for one or more downlink transmissions of the first subset of downlink transmissions. The DCI manager 1330 may transmit, to the UE, downlink control information that includes a resource allocation for second subset of downlink transmissions and that indicates that the UE is to provide a first feedback report for the first subset of downlink transmissions, and where the second subset of downlink transmissions have an associated second feedback report. The one-shot report manager 1340 may receive, from the UE, the first feedback report multiplexed with the second feedback report in one or more uplink control information transmissions.

In some cases, the DCI manager 1330 may transmit, to a UE, downlink control information that indicates the UE is to provide a feedback report for a set of downlink transmissions. The one-shot report manager 1340 may receive the feedback report from the UE, where a last downlink transmission of the set of downlink transmissions that is included in the feedback report is determined based on a timing the downlink control information that schedules the set of downlink transmissions, a latest downlink transmission that meets a feedback timeline condition, or any combinations thereof. The HARQ feedback manager 1325 may determine HARQ feedback based on the feedback report.

The transmitter 1345 may transmit signals generated by other components of the device 1305. In some examples, the transmitter 1345 may be collocated with a receiver 1310 in a transceiver module. For example, the transmitter 1345 may be an example of aspects of the transceiver 1520 described with reference to FIG. 15. The transmitter 1345 may utilize a single antenna or a set of antennas.

Figure 14:
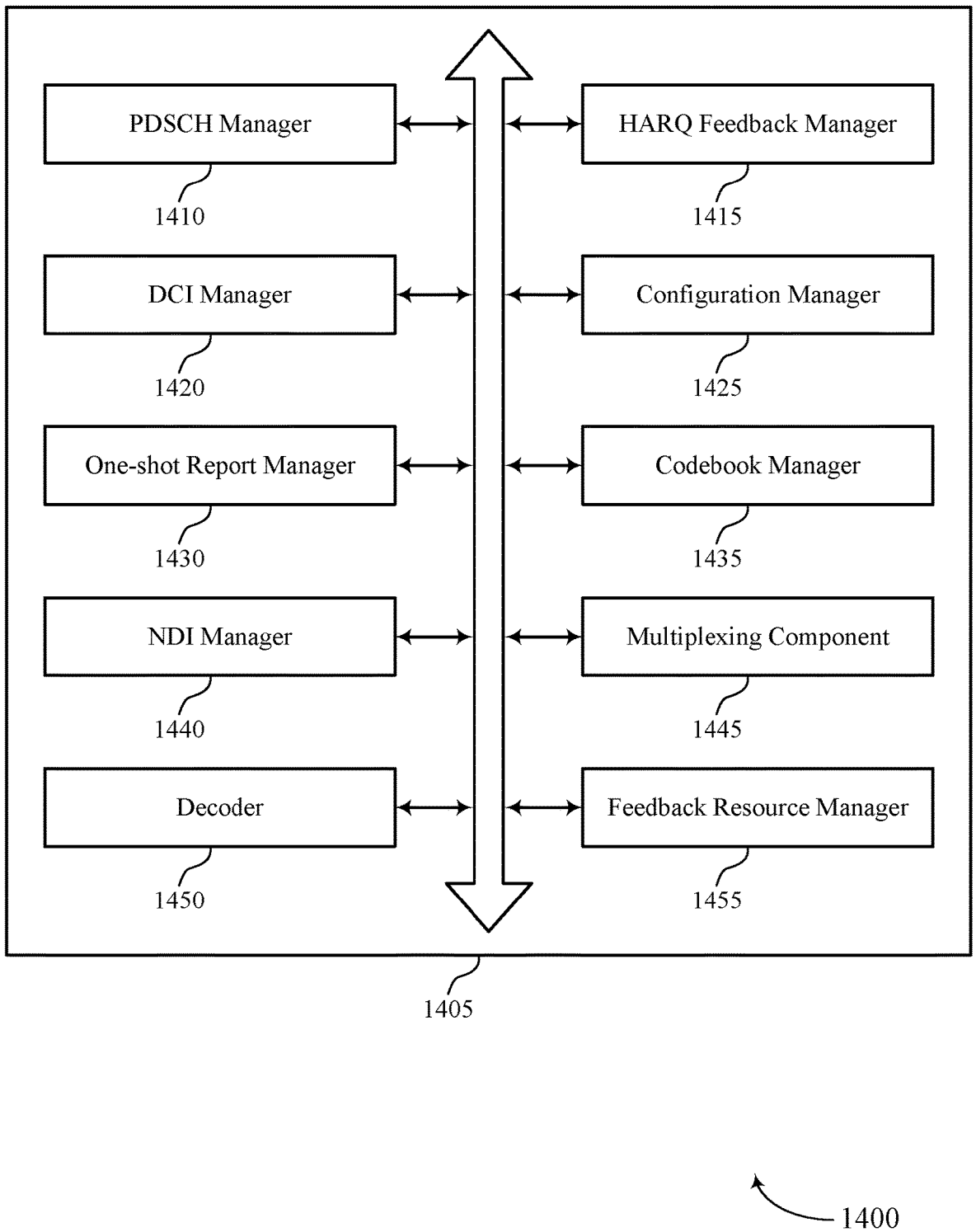
FIG. 14 shows a block diagram of a communications manager that supports acknowledgment feedback techniques in shared radio frequency spectrum in accordance with aspects of the present disclosure.

FIG. 14 shows a block diagram 1400 of a communications manager 1405 that supports acknowledgment feedback techniques in shared radio frequency spectrum in accordance with aspects of the present disclosure. The communications manager 1405 may be an example of aspects of a communications manager 1215, a communications manager 1315, or a communications manager 1510 described herein. The communications manager 1405 may include a PDSCH manager 1410, a HARQ feedback manager 1415, a DCI manager 1420, a configuration manager 1425, an one-shot report manager 1430, a codebook manager 1435, a NDI manager 1440, a multiplexing component 1445, a decoder 1450, and a feedback resource manager 1455. Each of these modules may communicate, directly or indirectly, with one another (e.g., via one or more buses).

The PDSCH manager 1410 may transmit a set of downlink transmissions to a UE, the set of downlink transmissions having one or more corresponding sets of uplink resources for transmission of HARQ feedback from the UE.

In some examples, the PDSCH manager 1410 may transmit a set of downlink transmissions to the UE, the set of downlink transmissions having one or more corresponding sets of uplink resources for transmission of HARQ feedback from the UE.

In some examples, the PDSCH manager 1410 may transmit a first subset of downlink transmissions to a UE, the first subset of downlink transmissions having one or more corresponding sets of uplink resources for transmission of HARQ feedback from the UE.

The HARQ feedback manager 1415 may determine, based on monitoring the one or more sets of uplink resources, that HARQ feedback from the UE is missing for one or more downlink transmissions of the set of downlink transmissions.

In some examples, the HARQ feedback manager 1415 may determine, based on monitoring the one or more sets of uplink resources, that HARQ feedback from the UE is missing for one or more downlink transmissions of the set of downlink transmissions.

In some examples, the HARQ feedback manager 1415 may determine, based on monitoring the one or more sets of uplink resources, that HARQ feedback from the UE is missing for one or more downlink transmissions of the first subset of downlink transmissions.

In some examples, the HARQ feedback manager 1415 may determine HARQ feedback based on the feedback report. In some examples, the HARQ feedback manager 1415 may receive a multiplexed set of HARQ feedback. In some examples, the HARQ feedback manager 1415 may determine the HARQ feedback from the UE for each of the first feedback report and the second feedback report based on a mapping between the codebooks and HARQ feedback.

In some cases, the HARQ feedback includes one or more of acknowledgment (ACK) indications, negative acknowledgment (NACK) indications, a new data indicator (NDI), or combinations thereof, that are each associated with a corresponding downlink transmission of the set of downlink transmissions. In some cases, the first feedback report includes HARQ feedback for at least a first downlink transmission, and the second feedback report also includes the HARQ feedback for at least the first downlink transmission.

The DCI manager 1420 may transmit, to the UE, downlink control information that indicates the UE is to provide a feedback report for at least a subset of downlink transmissions, where the subset of downlink transmissions is less than the set of downlink transmissions.

In some examples, the DCI manager 1420 may transmit, to the UE, downlink control information that includes a resource allocation for second subset of downlink transmissions and that indicates that the UE is to provide a first feedback report for the first subset of downlink transmissions, and where the second subset of downlink transmissions have an associated second feedback report.

In some examples, the DCI manager 1420 may transmit a set of information fields in the downlink control information, where a first information field of the set of information fields indicates the subset of downlink transmissions to be included with the feedback report.

In some cases, the subset of downlink transmissions include one or more downlink transmissions that are associated with one a transport block of a set of transport blocks, a component carrier of a set of component carriers, a feedback process identification of a set of feedback process identifications, a code block of a set of code blocks, or any combinations thereof.

In some cases, the first information field provides an explicit indication of the subset of downlink transmissions to be included with the feedback report. In some cases, the explicit indication specifies one or more component carriers, transport blocks, feedback process identifications, code blocks, or any combinations thereof to be included with the feedback report. In some cases, the first information field provides an implicit indication of the subset of downlink transmissions to be included with the feedback report. In some cases, the implicit indication is based on one or more component carriers (CCs) scheduled in the downlink control information, a CC used to transmit the downlink control information, or any combinations thereof.

In some cases, the first field is a downlink assignment indicator field that is reused to indicate the subset of downlink transmissions to be included with the feedback report. In some cases, the first set of uplink resources and the second set of uplink resources are indicated in the downlink control information. In some cases, the downlink control information provides an uplink control channel resource indicator that is mapped to the first set of uplink resources and the second set of uplink resources.

The configuration manager 1425 may configure a UE for reporting HARQ feedback that indicates successful or unsuccessful reception of one or more downlink transmissions at the UE, where each downlink transmission has an associated data indicator that indicates whether the downlink transmission includes an initial transmission of a transport block or a retransmission of a previously transmitted transport block, and where the HARQ feedback indicates one or more of a default data indication, a three-state indication of feedback based on an acknowledgment (ACK) and transport block indication or a negative acknowledgment (NACK) indication, or combinations thereof.

The one-shot report manager 1430 may receive, from the UE, the feedback report that indicates, for each of the one or more downlink transmissions, one or more of the three-state indication of feedback, the default data indication, or any combinations thereof.

In some examples, the one-shot report manager 1430 may receive, from the UE, the first feedback report multiplexed with the second feedback report in one or more uplink control information transmissions.

In some examples, the one-shot report manager 1430 may receive the feedback report from the UE, where a last downlink transmission of the set of downlink transmissions that is included in the feedback report is determined based on a timing the downlink control information that schedules the set of downlink transmissions, a latest downlink transmission that meets a feedback timeline condition, or any combinations thereof.

In some examples, the one-shot report manager 1430 may determine the last downlink transmission as a latest downlink transmission that scheduled in the downlink control information. In some examples, the one-shot report manager 1430 may determine the last downlink transmission as a latest downlink transmission that scheduled in one of two or more different downlink control information transmissions in which the feedback report is requested and that indicates a same set of uplink resources for transmitting the feedback report. In some examples, the one-shot report manager 1430 may determine the last downlink transmission as a latest downlink transmission that is transmitted prior to transmitting the downlink control information. In some examples, the one-shot report manager 1430 may determine the last downlink transmission as a latest downlink transmission that satisfies the feedback timeline condition, and where the feedback timeline condition indicates a minimum time duration at the UE between receiving a downlink transmission and transmitting associated HARQ feedback.

In some cases, a first symbol of a set of uplink resources for transmitting the feedback report is selected for determining the minimum time duration, and where the first symbol of the set of uplink resources is determined based on one or more of uplink control information multiplexing of the feedback report with other uplink control information, or an uplink control channel resource indicator provided with the downlink control information.

The codebook manager 1435 may configure a codebook with a set of entries that are mapped to a set of different combinations of HARQ feedback for a set of feedback process identifications to be reported in the feedback report. In some examples, the codebook manager 1435 may identify a first codebook entry associated with the first feedback report, where the first codebook entry is mapped to a first subset of HARQ feedback and one or more parameter values associated with the first subset of downlink transmissions. In some examples, the codebook manager 1435 may identify a second codebook entry associated with the second feedback report, where the second codebook entry is mapped to the second subset of HARQ feedback and one or more different parameter values than the first codebook entry.

The NDI manager 1440 may identify a default data indication is reported by the UE for a first feedback process identification for which the UE has not received scheduling information that indicates the first feedback process identification is to be used to indicate feedback for one of the subset of the downlink transmissions. In some cases, the default data indication is provided to a polar decoder to be applied as a frozen bit to assist decoding of the feedback report when scheduling information that indicates the first feedback process identification has not been transmitted to the UE. In some cases, the default data indication is provided to the UE when scheduling information that indicates the first feedback process identification is transmitted to the UE.

The multiplexing component 1445 may demultiplex the HARQ feedback based on a first codebook configured for reporting the first feedback report and a second codebook for reporting the second feedback report. In some cases, the first feedback report is concatenated with the second feedback report.

The decoder 1450 may decode uplink transmissions. In some cases, a payload of each of the first feedback report and the second feedback report is encoded at the UE, and where the encoding is performed before or after the UE concatenates the first report with the second report, and where the decoder decodes the payload based on the encoding at the UE.

The feedback resource manager 1455 may receive the first feedback report using a first set of uplink resources. In some examples, the feedback resource manager 1455 may receive the second feedback report using a second set of uplink resources. In some cases, a timeline for the UE to transmit using the first set of uplink resources and the second set of uplink resources is indicated by a feedback timing indicator that is mapped to time domain resources of the first set of uplink resources and the second set of uplink resources.

Figure 15:
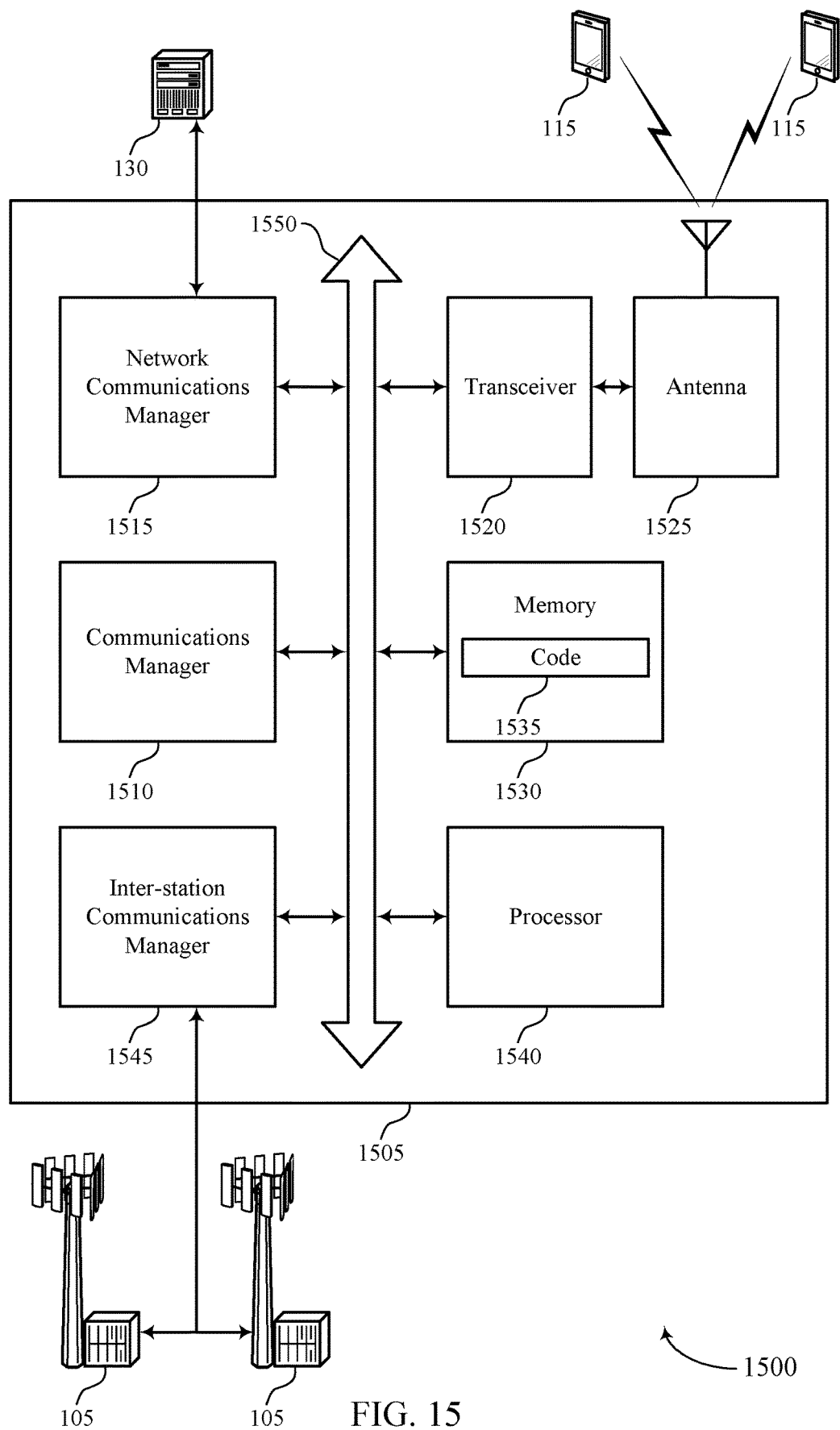
FIG. 15 shows a diagram of a system including a device that supports acknowledgment feedback techniques in shared radio frequency spectrum in accordance with aspects of the present disclosure.

FIG. 15 shows a diagram of a system 1500 including a device 1505 that supports acknowledgment feedback techniques in shared radio frequency spectrum in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit a set of downlink transmissions to a UE, the set of downlink transmissions having one or more corresponding sets of uplink resources for transmission of HARQ feedback from the UE, determine, based on monitoring the one or more sets of uplink resources, that HARQ feedback from the UE is missing for one or more downlink transmissions of the set of downlink transmissions, and transmit, to the UE, downlink control information that indicates the UE is to provide a feedback report for a subset of downlink transmissions, where the subset of downlink transmissions is less than the set of downlink transmissions.

The communications manager 1510 may also configure a UE for reporting HARQ feedback that indicates successful or unsuccessful reception of one or more downlink transmissions at the UE, where each downlink transmission has an associated data indicator that indicates whether the downlink transmission includes an initial transmission of a transport block or a retransmission of a previously transmitted transport block, and where the HARQ feedback indicates one or more of a default data indication, a three-state indication of feedback based on an acknowledgment (ACK) and transport block indication or a negative acknowledgment (NACK) indication, or combinations thereof, transmit a set of downlink transmissions to the UE, the set of downlink transmissions having one or more corresponding sets of uplink resources for transmission of HARQ feedback from the UE, determine, based on monitoring the one or more sets of uplink resources, that HARQ feedback from the UE is missing for one or more downlink transmissions of the set of downlink transmissions, transmit, to the UE, downlink control information that indicates the UE is to provide a feedback report for at least the one or more downlink transmissions, and receive, from the UE, the feedback report that indicates, for each of the one or more downlink transmissions, one or more of the three-state indication of feedback, the default data indication, or any combinations thereof.

The communications manager 1510 may also transmit a first subset of downlink transmissions to a UE, the first subset of downlink transmissions having one or more corresponding sets of uplink resources for transmission of HARQ feedback from the UE, determine, based on monitoring the one or more sets of uplink resources, that HARQ feedback from the UE is missing for one or more downlink transmissions of the first subset of downlink transmissions, transmit, to the UE, downlink control information that includes a resource allocation for second subset of downlink transmissions and that indicates that the UE is to provide a first feedback report for the first subset of downlink transmissions, and where the second subset of downlink transmissions have an associated second feedback report, and receive, from the UE, the first feedback report multiplexed with the second feedback report in one or more uplink control information transmissions.

The communications manager 1510 may also transmit, to a UE, downlink control information that indicates the UE is to provide a feedback report for a set of downlink transmissions, receive the feedback report from the UE, where a last downlink transmission of the set of downlink transmissions that is included in the feedback report is determined based on a timing the downlink control information that schedules the set of downlink transmissions, a latest downlink transmission that meets a feedback timeline condition, or any combinations thereof, and determine HARQ feedback based on the feedback report.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting acknowledgment feedback techniques in shared radio frequency spectrum).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
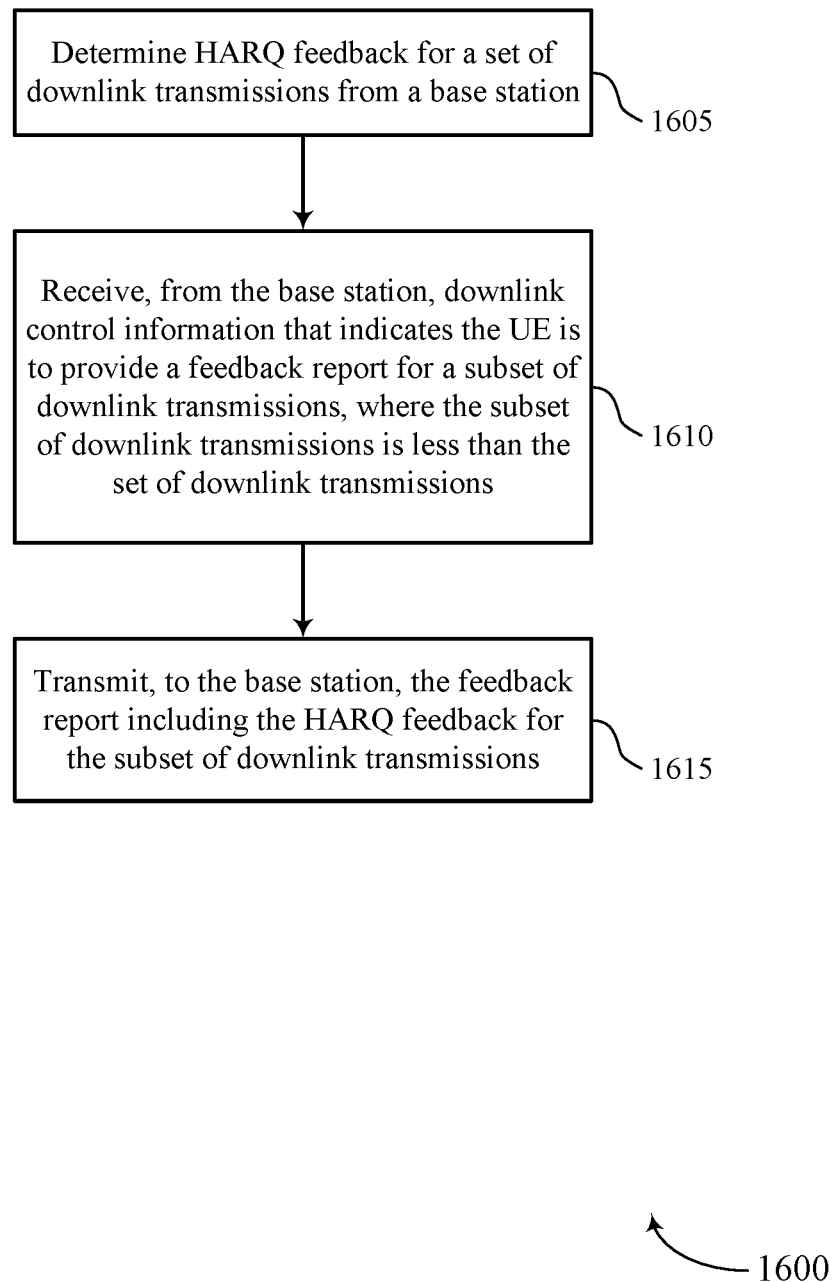
FIGS. 16 through 23 show flowcharts illustrating methods that support acknowledgment feedback techniques in shared radio frequency spectrum in accordance with aspects of the present disclosure.

FIG. 16 shows a flowchart illustrating a method 1600 that supports acknowledgment feedback techniques in shared radio frequency spectrum in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may determine HARQ feedback for a set of downlink transmissions from a base station. The operations of 1605 may be performed according to the methods described herein. In some examples, aspects of the operations of 1605 may be performed by a HARQ feedback manager as described with reference to FIGS. 8 through 11.

At 1610, the UE may receive, from the base station, downlink control information that indicates the UE is to provide a feedback report for a subset of downlink transmissions, where the subset of downlink transmissions is less than the set of downlink transmissions. The operations of 1610 may be performed according to the methods described herein. In some examples, aspects of the operations of 1610 may be performed by a DCI manager as described with reference to FIGS. 8 through 11.

At 1615, the UE may transmit, to the base station, the feedback report including the HARQ feedback for the subset of downlink transmissions. The operations of 1615 may be performed according to the methods described herein. In some examples, aspects of the operations of 1615 may be performed by an one-shot report manager as described with reference to FIGS. 8 through 11.

Figure 17:
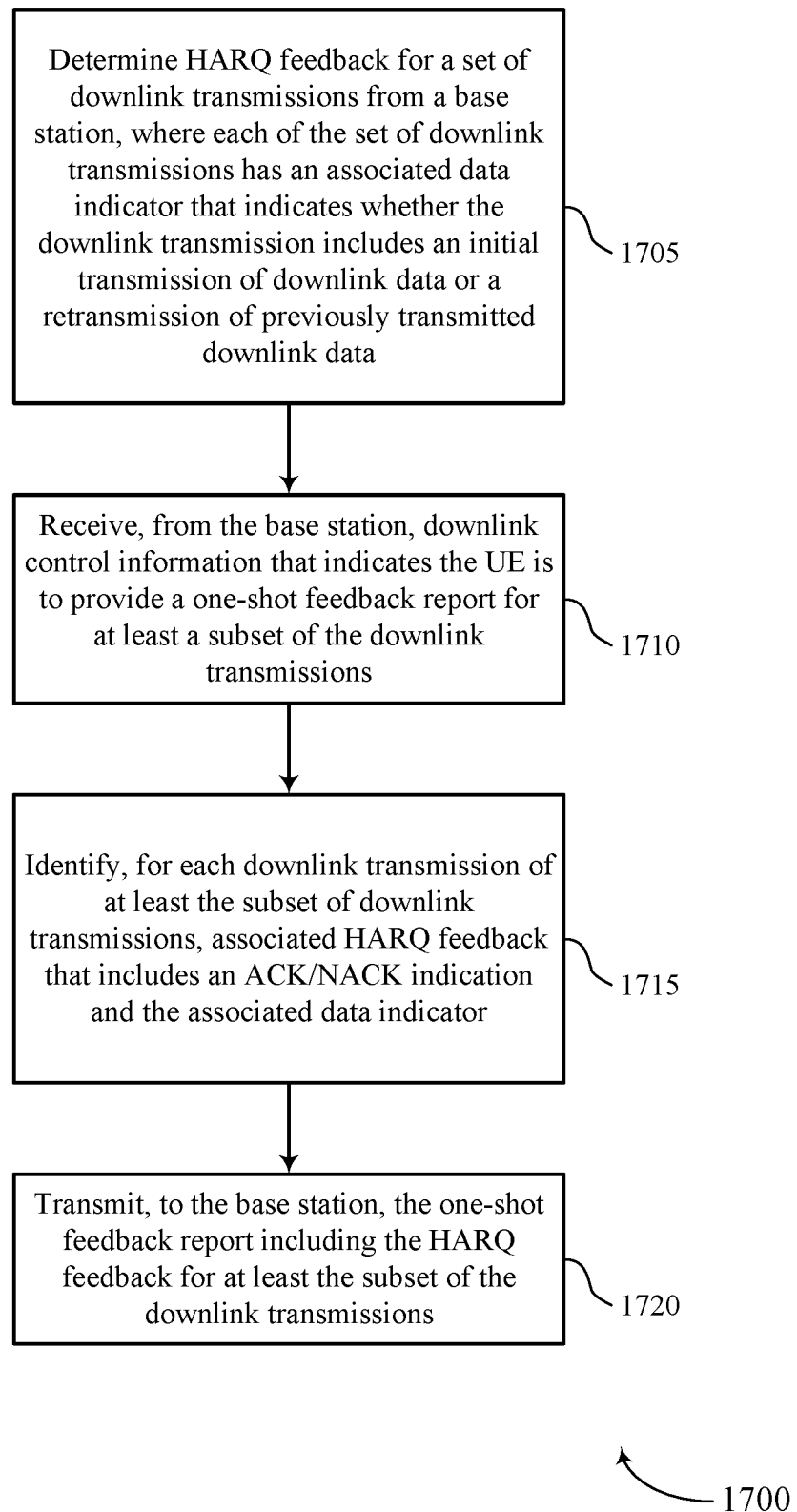

FIG. 17 shows a flowchart illustrating a method 1700 that supports acknowledgment feedback techniques in shared radio frequency spectrum in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may determine HARQ feedback for a set of downlink transmissions from a base station, where each of the set of downlink transmissions has an associated data indicator that indicates whether the downlink transmission includes an initial transmission of downlink data or a retransmission of previously transmitted downlink data. The operations of 1705 may be performed according to the methods described herein. In some examples, aspects of the operations of 1705 may be performed by a HARQ feedback manager as described with reference to FIGS. 8 through 11.

At 1710, the UE may receive, from the base station, downlink control information that indicates the UE is to provide a one-shot feedback report for at least a subset of the downlink transmissions. The operations of 1710 may be performed according to the methods described herein. In some examples, aspects of the operations of 1710 may be performed by a DCI manager as described with reference to FIGS. 8 through 11.

At 1715, the UE may identify, for each downlink transmission of at least the subset of downlink transmissions, associated HARQ feedback that includes an ACK/NACK indication and the associated data indicator. The operations of 1715 may be performed according to the methods described herein. In some examples, aspects of the operations of 1715 may be performed by a codebook manager as described with reference to FIGS. 8 through 11.

At 1720, the UE may transmit, to the base station, the one-shot feedback report including the HARQ feedback for at least the subset of the downlink transmissions. The operations of 1720 may be performed according to the methods described herein. In some examples, aspects of the operations of 1720 may be performed by an one-shot report manager as described with reference to FIGS. 8 through 11.

Figure 18:
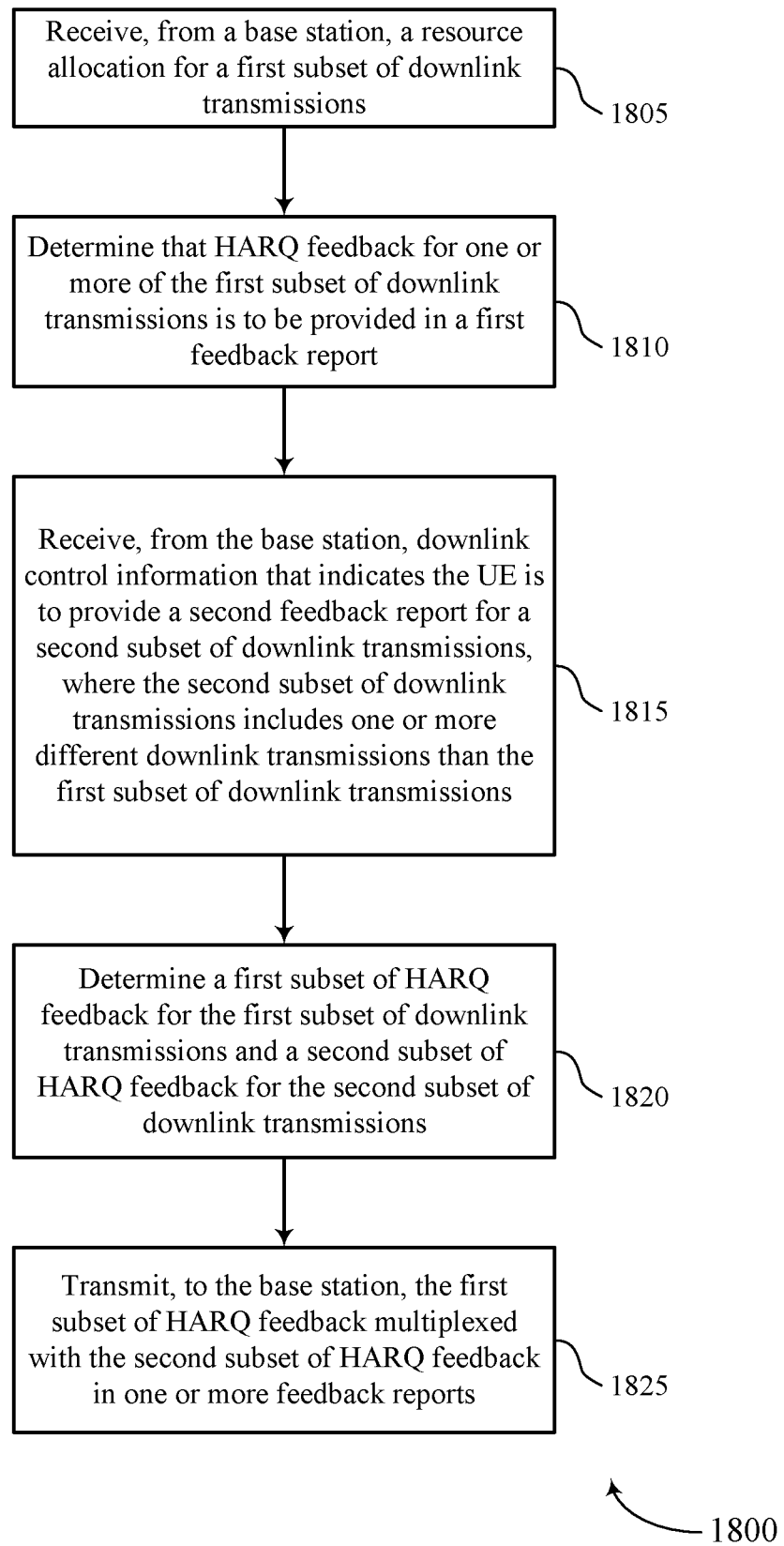

FIG. 18 shows a flowchart illustrating a method 1800 that supports acknowledgment feedback techniques in shared radio frequency spectrum in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a resource allocation for a first subset of downlink transmissions. The operations of 1805 may be performed according to the methods described herein. In some examples, aspects of the operations of 1805 may be performed by a DCI manager as described with reference to FIGS. 8 through 11.

At 1810, the UE may determine that HARQ feedback for one or more of the first subset of downlink transmissions is to be provided in a first feedback report. The operations of 1810 may be performed according to the methods described herein. In some examples, aspects of the operations of 1810 may be performed by a HARQ feedback manager as described with reference to FIGS. 8 through 11.

At 1815, the UE may receive, from the base station, downlink control information that indicates the UE is to provide a second feedback report for a second subset of downlink transmissions, where the second subset of downlink transmissions includes one or more different downlink transmissions than the first subset of downlink transmissions. The operations of 1815 may be performed according to the methods described herein. In some examples, aspects of the operations of 1815 may be performed by a DCI manager as described with reference to FIGS. 8 through 11.

At 1820, the UE may determine a first subset of HARQ feedback for the first subset of downlink transmissions and a second subset of HARQ feedback for the second subset of downlink transmissions. The operations of 1820 may be performed according to the methods described herein. In some examples, aspects of the operations of 1820 may be performed by a HARQ feedback manager as described with reference to FIGS. 8 through 11.

At 1825, the UE may transmit, to the base station, the first subset of HARQ feedback multiplexed with the second subset of HARQ feedback in one or more feedback reports. The operations of 1825 may be performed according to the methods described herein. In some examples, aspects of the operations of 1825 may be performed by an one-shot report manager as described with reference to FIGS. 8 through 11.

Figure 19:
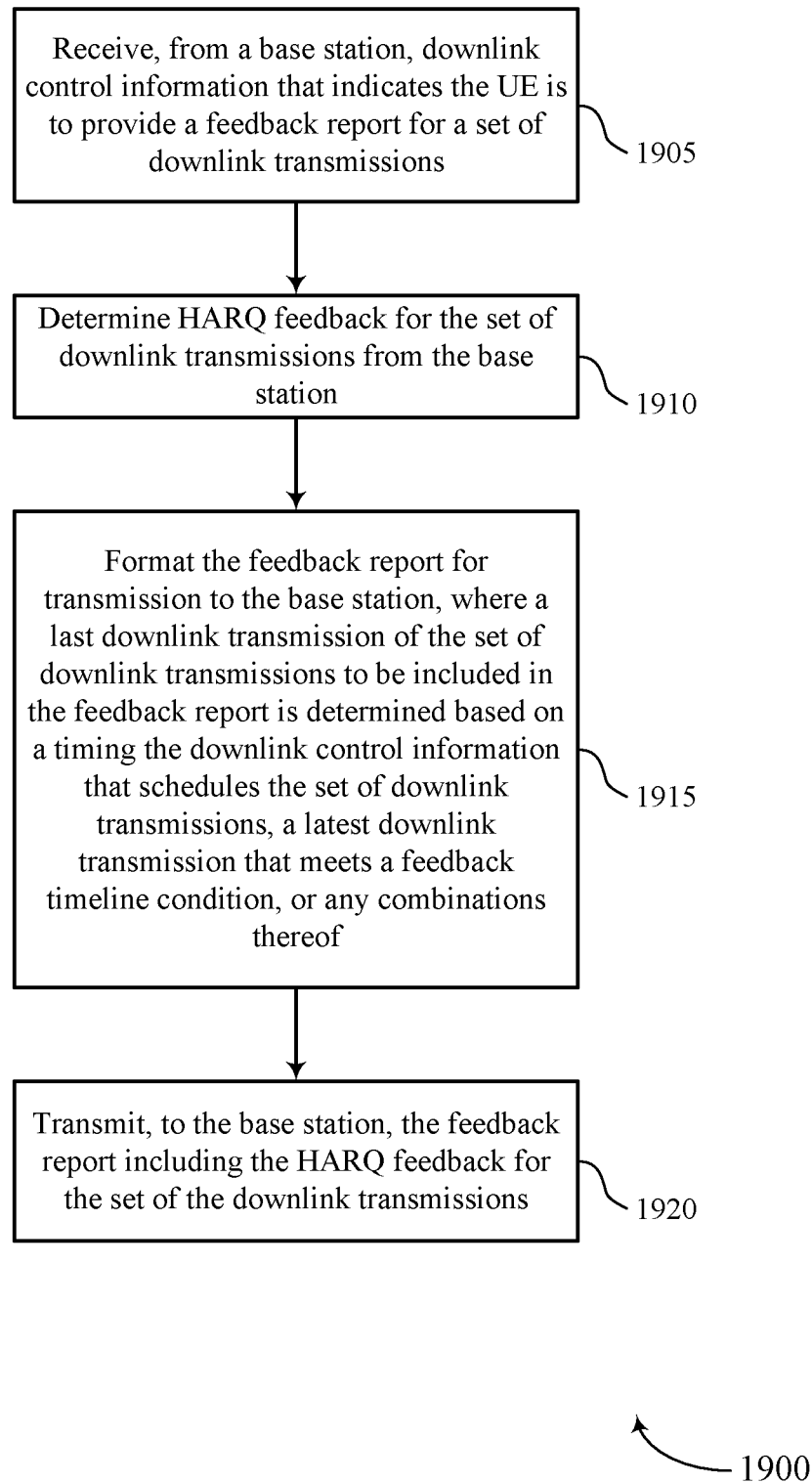

FIG. 19 shows a flowchart illustrating a method 1900 that supports acknowledgment feedback techniques in shared radio frequency spectrum in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, downlink control information that indicates the UE is to provide a feedback report for a set of downlink transmissions. The operations of 1905 may be performed according to the methods described herein. In some examples, aspects of the operations of 1905 may be performed by a DCI manager as described with reference to FIGS. 8 through 11.

At 1910, the UE may determine HARQ feedback for the set of downlink transmissions from the base station. The operations of 1910 may be performed according to the methods described herein. In some examples, aspects of the operations of 1910 may be performed by a HARQ feedback manager as described with reference to FIGS. 8 through 11.

At 1915, the UE may format the feedback report for transmission to the base station, where a last downlink transmission of the set of downlink transmissions to be included in the feedback report is determined based on a timing the downlink control information that schedules the set of downlink transmissions, a latest downlink transmission that meets a feedback timeline condition, or any combinations thereof. The operations of 1915 may be performed according to the methods described herein. In some examples, aspects of the operations of 1915 may be performed by an one-shot report manager as described with reference to FIGS. 8 through 11.

At 1920, the UE may transmit, to the base station, the feedback report including the HARQ feedback for the set of the downlink transmissions. The operations of 1920 may be performed according to the methods described herein. In some examples, aspects of the operations of 1920 may be performed by an one-shot report manager as described with reference to FIGS. 8 through 11.

Figure 20:
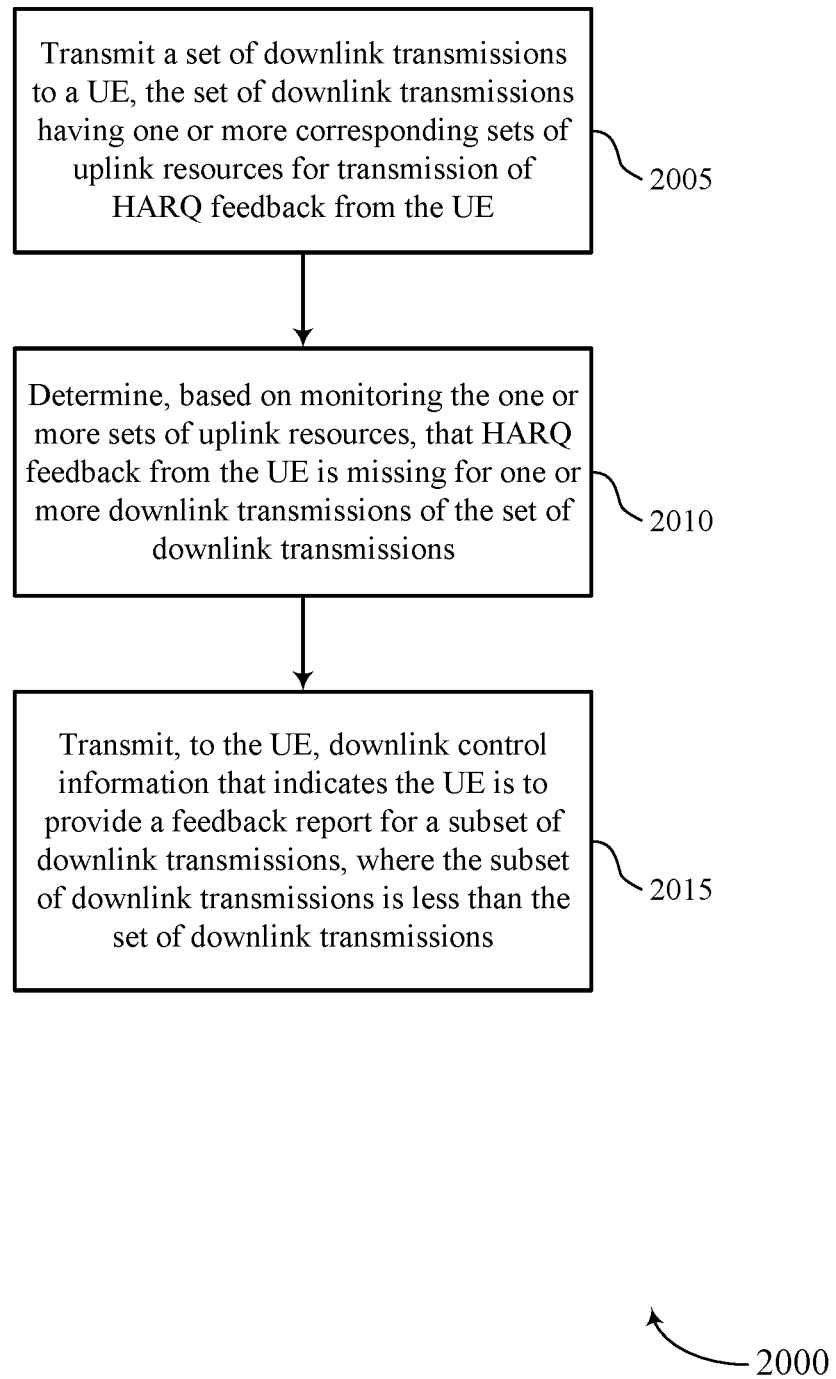

FIG. 20 shows a flowchart illustrating a method 2000 that supports acknowledgment feedback techniques in shared radio frequency spectrum in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may transmit a set of downlink transmissions to a UE, the set of downlink transmissions having one or more corresponding sets of uplink resources for transmission of HARQ feedback from the UE. The operations of 2005 may be performed according to the methods described herein. In some examples, aspects of the operations of 2005 may be performed by a PDSCH manager as described with reference to FIGS. 12 through 15.

At 2010, the base station may determine, based on monitoring the one or more sets of uplink resources, that HARQ feedback from the UE is missing for one or more downlink transmissions of the set of downlink transmissions. The operations of 2010 may be performed according to the methods described herein. In some examples, aspects of the operations of 2010 may be performed by a HARQ feedback manager as described with reference to FIGS. 12 through 15.

At 2015, the base station may transmit, to the UE, downlink control information that indicates the UE is to provide a feedback report for a subset of downlink transmissions, where the subset of downlink transmissions is less than the set of downlink transmissions. The operations of 2015 may be performed according to the methods described herein. In some examples, aspects of the operations of 2015 may be performed by a DCI manager as described with reference to FIGS. 12 through 15.

Figure 21:
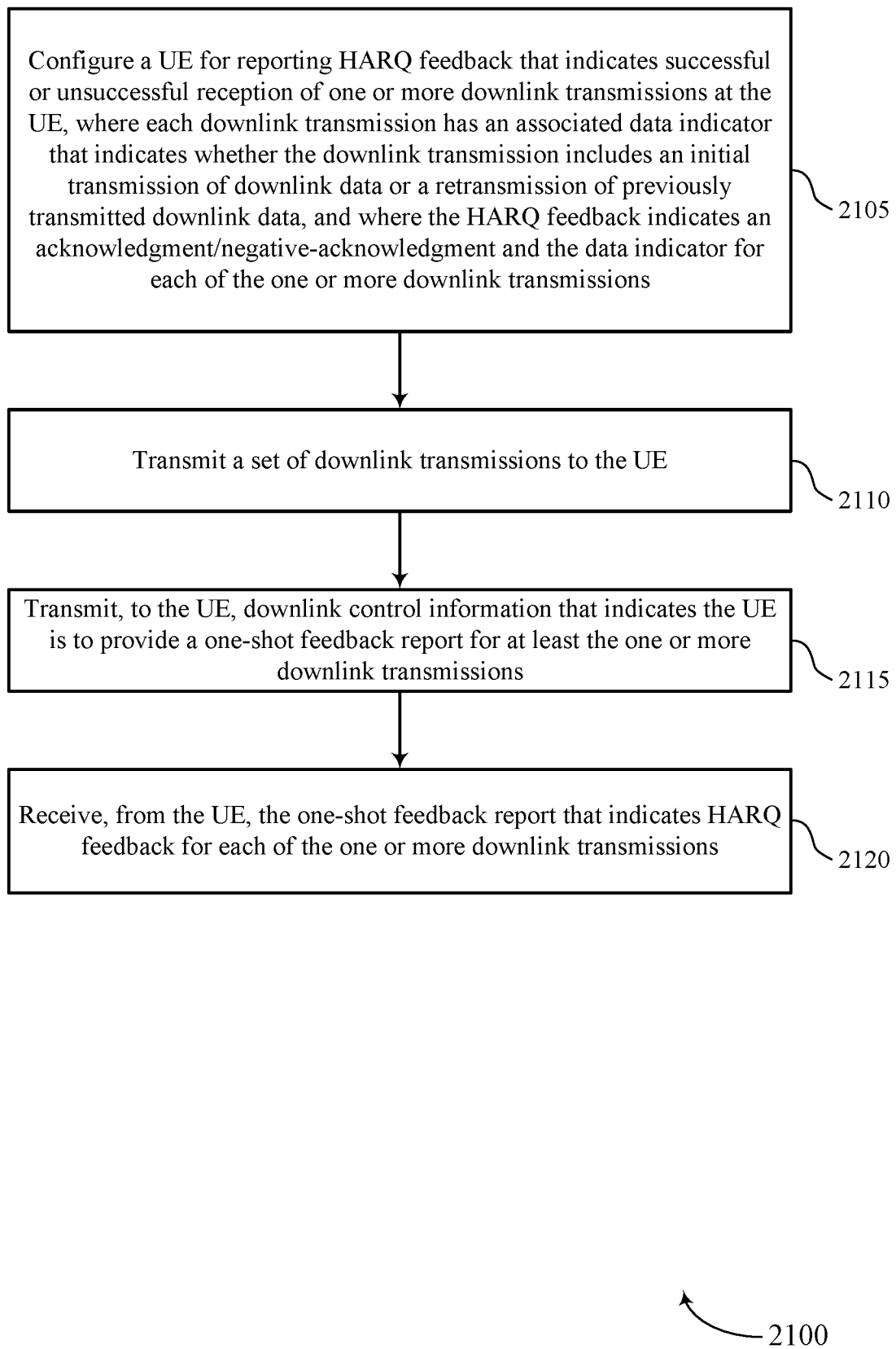

FIG. 21 shows a flowchart illustrating a method 2100 that supports acknowledgment feedback techniques in shared radio frequency spectrum in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may configure a UE for reporting HARQ feedback that indicates successful or unsuccessful reception of one or more downlink transmissions at the UE, where each downlink transmission has an associated data indicator that indicates whether the downlink transmission includes an initial transmission of downlink data or a retransmission of previously transmitted downlink data, and where the HARQ feedback indicates an ACK/NACK and the data indicator for each of the one or more downlink transmissions. The operations of 2105 may be performed according to the methods described herein. In some examples, aspects of the operations of 2105 may be performed by a configuration manager as described with reference to FIGS. 12 through 15.

At 2110, the base station may transmit a set of downlink transmissions to the UE. The operations of 2110 may be performed according to the methods described herein. In some examples, aspects of the operations of 2110 may be performed by a PDSCH manager as described with reference to FIGS. 12 through 15.

At 2115, the base station may transmit, to the UE, downlink control information that indicates the UE is to provide a one-shot feedback report for at least one or more downlink transmissions. The operations of 2115 may be performed according to the methods described herein. In some examples, aspects of the operations of 2115 may be performed by a DCI manager as described with reference to FIGS. 12 through 15.

At 2120, the base station may receive, from the UE, the one-shot feedback report that indicates HARQ feedback for each of the one or more downlink transmissions. The operations of 2120 may be performed according to the methods described herein. In some examples, aspects of the operations of 2120 may be performed by an one-shot report manager as described with reference to FIGS. 12 through 15.

Figure 22:
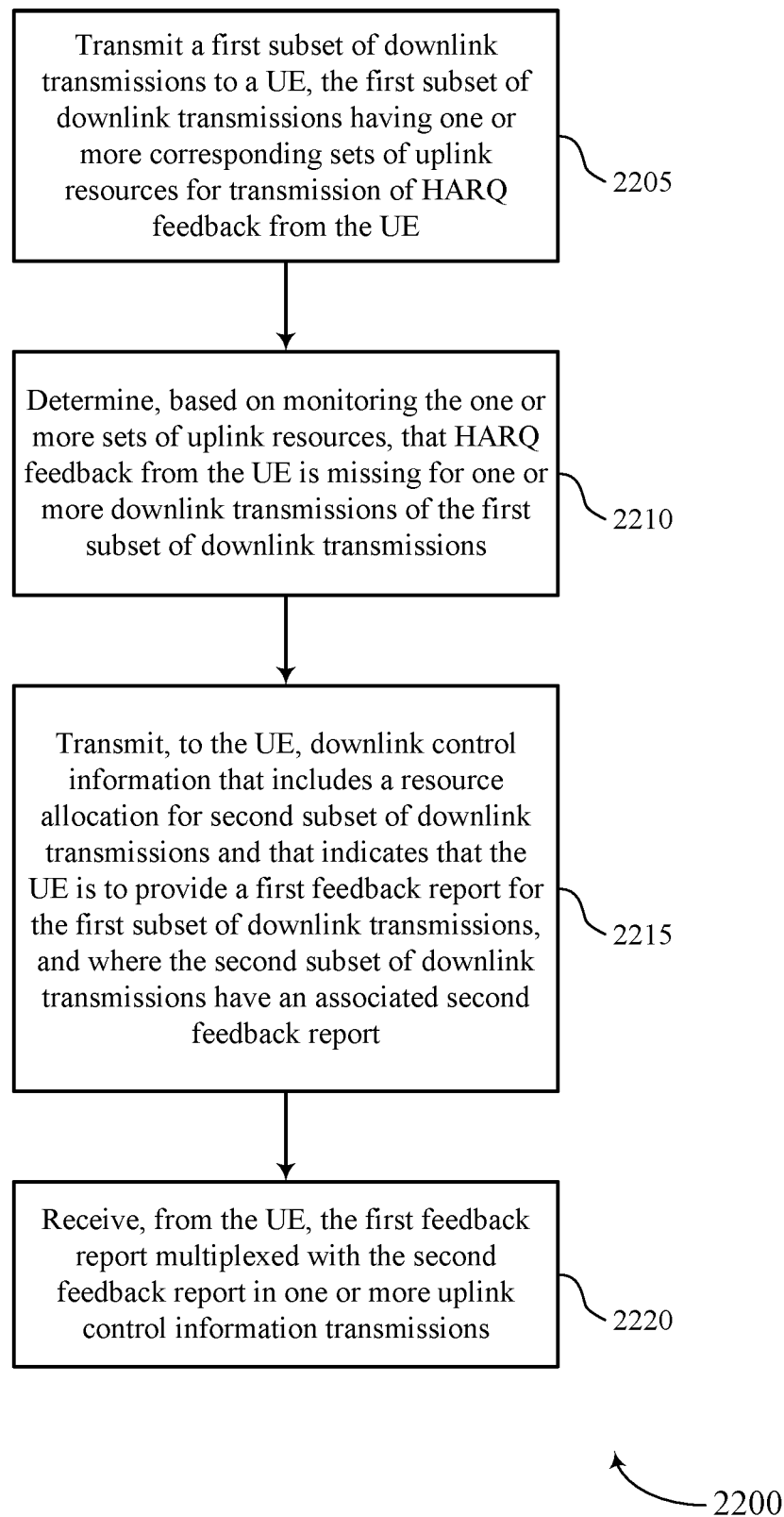

FIG. 22 shows a flowchart illustrating a method 2200 that supports acknowledgment feedback techniques in shared radio frequency spectrum in accordance with aspects of the present disclosure. The operations of method 2200 may be implemented by a base station 105 or its components as described herein. For example, the operations of method 2200 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2205, the base station may transmit a first subset of downlink transmissions to a UE, the first subset of downlink transmissions having one or more corresponding sets of uplink resources for transmission of HARQ feedback from the UE. The operations of 2205 may be performed according to the methods described herein. In some examples, aspects of the operations of 2205 may be performed by a PDSCH manager as described with reference to FIGS. 12 through 15.

At 2210, the base station may determine, based on monitoring the one or more sets of uplink resources, that HARQ feedback from the UE is missing for one or more downlink transmissions of the first subset of downlink transmissions. The operations of 2210 may be performed according to the methods described herein. In some examples, aspects of the operations of 2210 may be performed by a HARQ feedback manager as described with reference to FIGS. 12 through 15.

At 2215, the base station may transmit, to the UE, downlink control information that includes a resource allocation for second subset of downlink transmissions and that indicates that the UE is to provide a first feedback report for the first subset of downlink transmissions, and where the second subset of downlink transmissions have an associated second feedback report. The operations of 2215 may be performed according to the methods described herein. In some examples, aspects of the operations of 2215 may be performed by a DCI manager as described with reference to FIGS. 12 through 15.

At 2220, the base station may receive, from the UE, the first feedback report multiplexed with the second feedback report in one or more uplink control information transmissions. The operations of 2220 may be performed according to the methods described herein. In some examples, aspects of the operations of 2220 may be performed by an one-shot report manager as described with reference to FIGS. 12 through 15.

Figure 23:
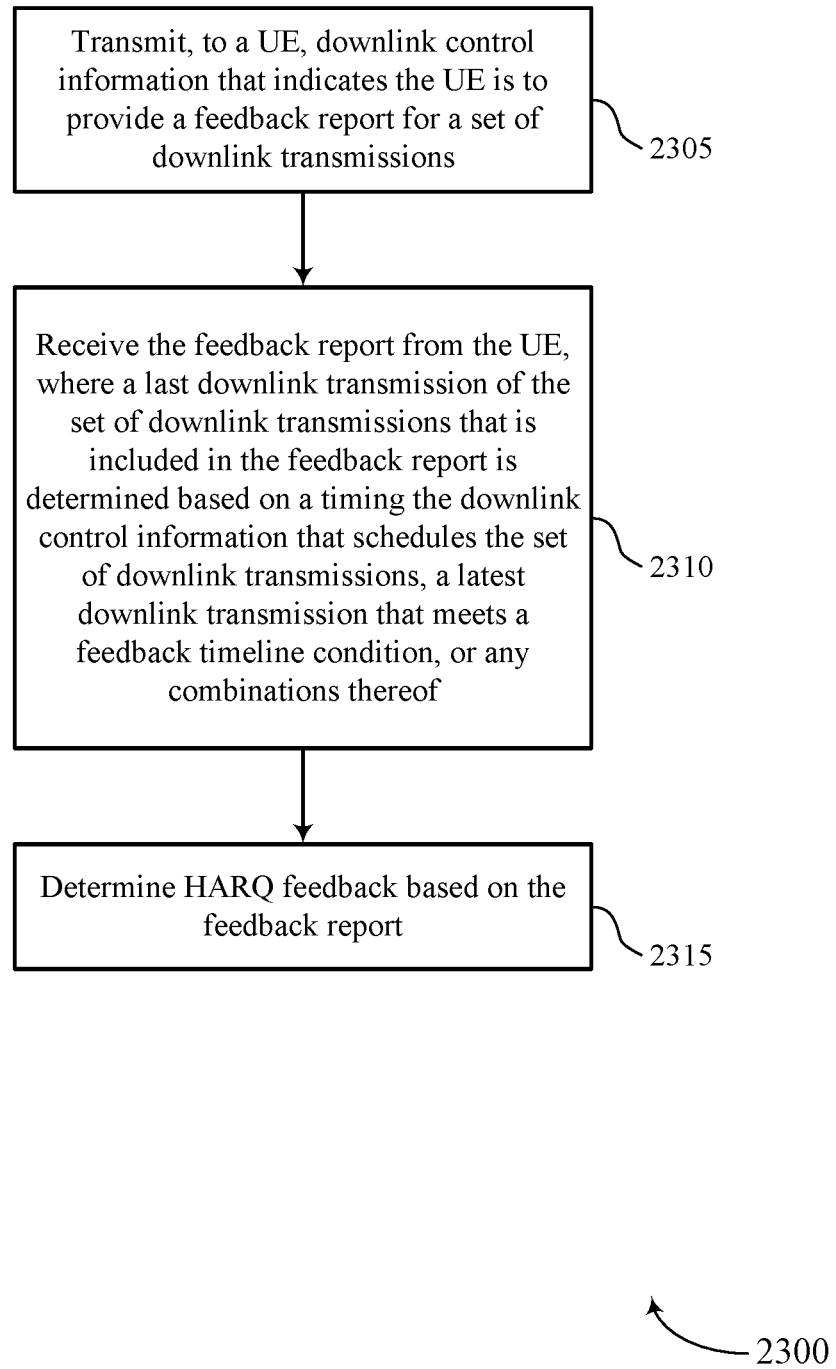

FIG. 23 shows a flowchart illustrating a method 2300 that supports acknowledgment feedback techniques in shared radio frequency spectrum in accordance with aspects of the present disclosure. The operations of method 2300 may be implemented by a base station 105 or its components as described herein. For example, the operations of method 2300 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2305, the base station may transmit, to a UE, downlink control information that indicates the UE is to provide a feedback report for a set of downlink transmissions. The operations of 2305 may be performed according to the methods described herein. In some examples, aspects of the operations of 2305 may be performed by a DCI manager as described with reference to FIGS. 12 through 15.

At 2310, the base station may receive the feedback report from the UE, where a last downlink transmission of the set of downlink transmissions that is included in the feedback report is determined based on a timing the downlink control information that schedules the set of downlink transmissions, a latest downlink transmission that meets a feedback timeline condition, or any combinations thereof. The operations of 2310 may be performed according to the methods described herein. In some examples, aspects of the operations of 2310 may be performed by an one-shot report manager as described with reference to FIGS. 12 through 15.

At 2315, the base station may determine HARQ feedback based on the feedback report. The operations of 2315 may be performed according to the methods described herein. In some examples, aspects of the operations of 2315 may be performed by a HARQ feedback manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving downlink control information that indicates the UE is to provide a one- shot feedback report for a downlink transmission to the UE, wherein the downlink transmission includes one or more transport blocks and each transport block comprises a plurality of code block groups, and wherein the downlink control information includes a request for code block group level feedback to be transmitted by the UE for the downlink transmission based at least in part on one or more feedback processes;
   determining feedback information at the code block group level for the downlink transmission based at least in part on the request; and
   transmitting, from the UE, the one-shot feedback report including the code block group level feedback information wherein the transmission includes only the one-shot feedback report.

2. The method of claim 1, wherein:
   the request for the code block group level feedback is configured in radio resource control (RRC) configuration information.

3. The method of claim 1, further comprising:
   receiving radio resource control (RRC) configuration information that indicates whether code block group level feedback can be requested for the one-shot feedback report.

4. The method of claim 1, wherein the downlink control information indicates the UE is to provide feedback information for each component carrier of a plurality of component carriers.

5. The method of claim 1, wherein the one-shot feedback report includes one or more acknowledgment (ACK) or a negative acknowledgment (NACK) indications for each of a plurality of feedback processes that each have a different feedback process identification.

6. The method of claim 5, wherein:
   the downlink transmission has an associated data indicator that indicates whether the downlink transmission includes an initial transmission of downlink data or a retransmission of previously transmitted downlink data, and
   the one-shot feedback report further includes, for each of the plurality of feedback processes, the associated data indicator for the downlink transmission.

7. The method of claim 6, wherein a default data indicator is identified as the associated data indicator for the downlink transmission in an absence of scheduling information for a feedback process identification of the downlink transmission.

8. The method of claim 6, wherein the data indicator is a new data indicator (NDI).

9. A method for wireless communications at an access network entity, comprising:
   transmitting a downlink transmission to a user equipment (UE), wherein the downlink transmission includes one or more transport blocks and each transport block comprises a plurality of code block groups;
   transmitting, to the UE, downlink control information that indicates the UE is to provide a one-shot feedback report for the downlink transmission, wherein the downlink control information includes a request for code block group level feedback from the UE for the downlink transmission based at least in part on one or more feedback processes; and
   receiving, from the UE, the one-shot feedback report that indicates the code block group level feedback for the downlink transmission, wherein only the one-shot feedback report is included in an uplink transmission from the UE.

10. The method of claim 9, wherein:
    the request for the code block group level feedback is configured in radio resource control (RRC) configuration information.

11. The method of claim 9, further comprising:
    transmitting, to the UE, radio resource control (RRC) configuration information that indicates whether code block group level feedback can be requested for the one-shot feedback report.

12. The method of claim 9, wherein the downlink control information indicates the UE is to provide feedback information for each component carrier of a plurality of component carriers.

13. The method of claim 9, wherein the one-shot feedback report includes one or more acknowledgment (ACK) or a negative acknowledgment (NACK) indications for each of a plurality of feedback processes that each have a different feedback process identification.

14. The method of claim 13, wherein:
the downlink transmission has an associated data indicator that indicates whether the downlink transmission includes an initial transmission of downlink data or a retransmission of previously transmitted downlink data, and
the one-shot feedback report further includes, for each of the plurality of feedback processes, the associated data indicator for the downlink transmission.

15. The method of claim 14, wherein a default data indicator is provided as the data indicator for the downlink transmission in an absence of scheduling information for a feedback process identification of the downlink transmission.

16. The method of claim 14, wherein the data indicator is a new data indicator (NDI).

17. An apparatus for wireless communications at a user equipment (UE), comprising:
a processor,
memory coupled with the processor; and
instructions stored in the memory and executable by the processor to cause the apparatus to:
receive downlink control information that indicates the UE is to provide a one-shot feedback report for a downlink transmission to the UE, wherein the downlink transmission includes one or more transport blocks and each transport block comprises a plurality of code block groups, and wherein the downlink control information includes a request for code block group level feedback to be transmitted by the UE for the downlink transmission based at least in part on one or more feedback processes;
determine feedback information at the code block group level for the downlink transmission based at least in part on the request; and
transmit, from the UE, the one-shot feedback report including the code block group level feedback information wherein the transmission includes only the one-shot feedback report.

18. The apparatus of claim 17, wherein:
the request for the code block group level feedback is configured in radio resource control (RRC) configuration information.

19. The apparatus of claim 17, wherein the instructions are further executable by the processor to cause the apparatus to:
receive radio resource control (RRC) configuration information that indicates whether code block group level feedback can be requested for the one-shot feedback report.

20. The apparatus of claim 17, wherein the downlink control information indicates the UE is to provide feedback information for each component carrier of a plurality of component carriers.

21. The apparatus of claim 17, wherein the one-shot feedback report includes one or more acknowledgment (ACK) or a negative acknowledgment (NACK) indications for each of a plurality of feedback processes that each have a different feedback process identification.

22. The apparatus of claim 21, wherein:
the downlink transmission has an associated data indicator that indicates whether the downlink transmission includes an initial transmission of downlink data or a retransmission of previously transmitted downlink data, and
the one-shot feedback report further includes, for each of the plurality of feedback processes, the associated data indicator for the associated downlink transmission.

23. The apparatus of claim 22, wherein a default data indicator is identified as the associated data indicator for the downlink transmission in an absence of scheduling information for a feedback process identification of the downlink transmission.

24. The apparatus of claim 22, wherein the data indicator is a new data indicator (NDI).

25. An apparatus for wireless communications at an access network entity, comprising:
a processor,
memory coupled with the processor; and
instructions stored in the memory and executable by the processor to cause the apparatus to:
transmit a downlink transmission to a user equipment (UE), wherein the downlink transmission includes one or more transport blocks and each transport block comprises a plurality of code block groups;
transmit, to the UE, downlink control information that indicates the UE is to provide a one-shot feedback report for the downlink transmission, wherein the downlink control information includes a request for code block group level feedback
from the UE for the downlink transmission based at least in part on one or more feedback processes; and receive, from the UE, the one-shot feedback report that indicates the code block group level feedback for the downlink transmission, wherein only the one-shot feedback report is included in an uplink transmission from the UE.

26. The apparatus of claim 25, wherein:
the request for the code block group level feedback is configured in radio resource control (RRC) configuration information.

27. The apparatus of claim 25, wherein the instructions are further executable by the processor to cause the apparatus to:
transmit, to the UE, radio resource control (RRC) configuration information that indicates whether code block group level feedback can be requested for the one-shot feedback report.

28. The apparatus of claim 25, wherein the downlink control information indicates the UE is to provide feedback information for each component carrier of a plurality of component carriers.

29. The apparatus of claim 25, wherein the one-shot feedback report includes one or more acknowledgment (ACK) or a negative acknowledgment (NACK) indications for each of a plurality of feedback processes that each have a different feedback process identification.

30. The apparatus of claim 29, wherein:
the downlink transmission has an associated data indicator that indicates whether the downlink transmission includes an initial transmission of downlink data or a retransmission of previously transmitted downlink data, and
the one-shot feedback report further includes, for each of the plurality of feedback processes, the associated data indicator for the downlink transmission.

31. The apparatus of claim 30, wherein a default data indicator is provided as the associated data indicator for the downlink transmission in an absence of scheduling information for a feedback process identification of the downlink transmission.

* * * * *